(12) United States Patent
Lewis

(10) Patent No.: US 6,525,886 B1
(45) Date of Patent: Feb. 25, 2003

(54) TWO GROUP ZOOM LENS HAVING WEAK FRONT ELEMENT

(75) Inventor: Alan E. Lewis, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/885,572

(22) Filed: Jun. 20, 2001

(51) Int. Cl.[7] .................................................. G02B 15/14
(52) U.S. Cl. ..................................... 359/691; 359/692
(58) Field of Search ................................. 359/692, 691

(56) References Cited

U.S. PATENT DOCUMENTS

| | | | |
|---|---|---|---|
| 5,270,867 A | 12/1993 | Estelle | |
| 5,329,401 A * | 7/1994 | Sato | 359/691 |
| 5,473,473 A | 12/1995 | Estelle et al. | |
| 5,596,453 A * | 1/1997 | Kim | 359/692 |
| 5,604,639 A | 2/1997 | Bietry et al. | |

* cited by examiner

Primary Examiner—Hung Xuan Dang

(57) ABSTRACT

A zoom lens is provided. The zoom lens includes a positive power first lens group having a first lens element and a second lens element, and a negative power second lens group having a third lens element. The first lens element can be made from plastic having either or both of its surfaces aspheric with a meniscus shape concave or convex to an object side. The first lens group includes a variable iris having a mechanical aperture stop positioned between the first lens element and the second lens element.

20 Claims, 24 Drawing Sheets

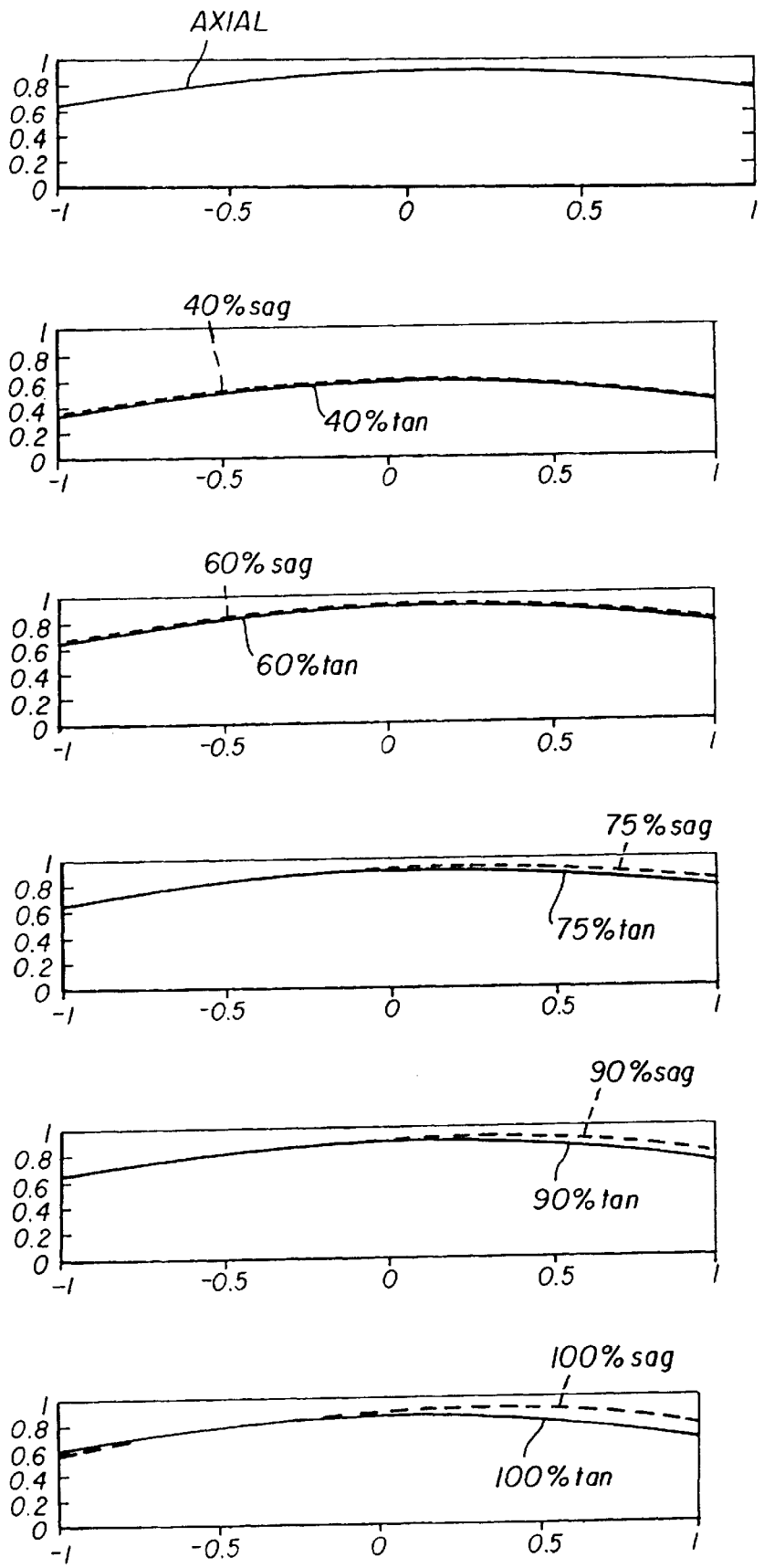

TWO GROUP ZOOM LENS HAVING WEAK FRONT ELEMENT

FIELD OF THE INVENTION

This invention relates generally to lens design, and in particular to a zoom lens for use in a camera.

BACKGROUND OF THE INVENTION

Compact, reasonably priced zoom lens for cameras are known. For example, U.S. Pat. No. 5,473,473 discloses a zoom lens having two plastic lens elements. The zoom lens includes a positive power lens element, a negative power lens element, and an aperture stop. While the zoom lens disclosed in U.S. Pat. No. 5,473,473 works extremely well for its intended purpose, plastic lenses having strong power are susceptible to a thermal reaction when exposed to changes in environmental operating conditions. This can cause a shifting of the image plane of the zoom lens relative to the rear (commonly referred to as last, etc.) element of the zoom lens.

As such, there is a need for a reasonably priced thermally stable (neutral, etc.) zoom lens that reduces shifting of the image plane relative to the rear element of the zoom lens caused by a thermal reaction of a plastic lens.

SUMMARY OF THE INVENTION

According to a feature of the present invention, a zoom lens includes, in order from an object side, a first lens group having a first lens element and a second lens element; and a second lens group having a third lens element. The zoom lens satisfies the following condition: $|\phi_1|/\phi_w < 0.003$, where $\phi_1$ is a power of the first lens element and $\phi_w$ is a power of the zoom lens in a wide angle position.

According to another feature of the present invention, a zoom lens includes, in order from an object side, a first lens group having a first lens element and a second lens element; and a second lens group having a third lens element. The zoom lens satisfies the following condition: $|\phi_1|/\phi_w < 0.08$, where $\phi_1$ is a power of the first lens element and $\phi_w$ is a power of the zoom lens in a wide angle position.

According to another feature of the present invention, a zoom lens includes, in order from an object side, a first lens group having a first lens element and a second lens element with the first lens group having a power and the second lens element having a power; and a second lens group having a third lens element, wherein the power of the first lens group is substantially equal to the power of the second lens element.

BRIEF DESCRIPTION OF THE DRAWINGS

In the detailed description of the preferred embodiments of the invention presented below, reference is made to the accompanying drawings, in which:

FIGS. 6A–6C are MTF performance plots of the fourth embodiment at various field zones in a wide angle, mid zoom, and telephoto position, respectively;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1A:
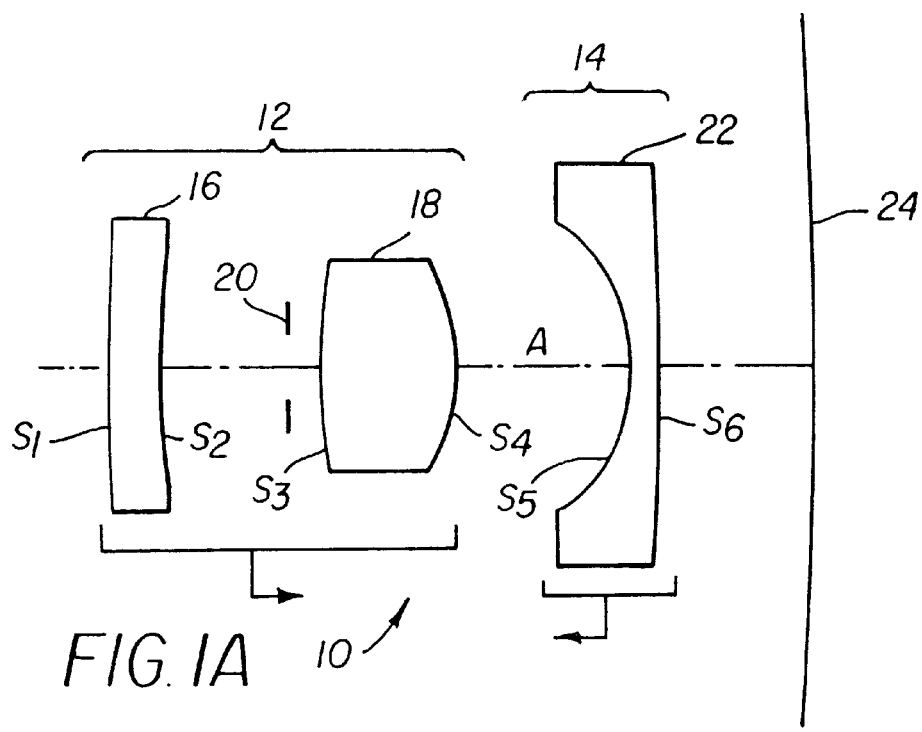
FIG. 1A is a cross sectional view of a first and second embodiment made in accordance with the present invention in a wide angle zoom position.
Figure 1B:
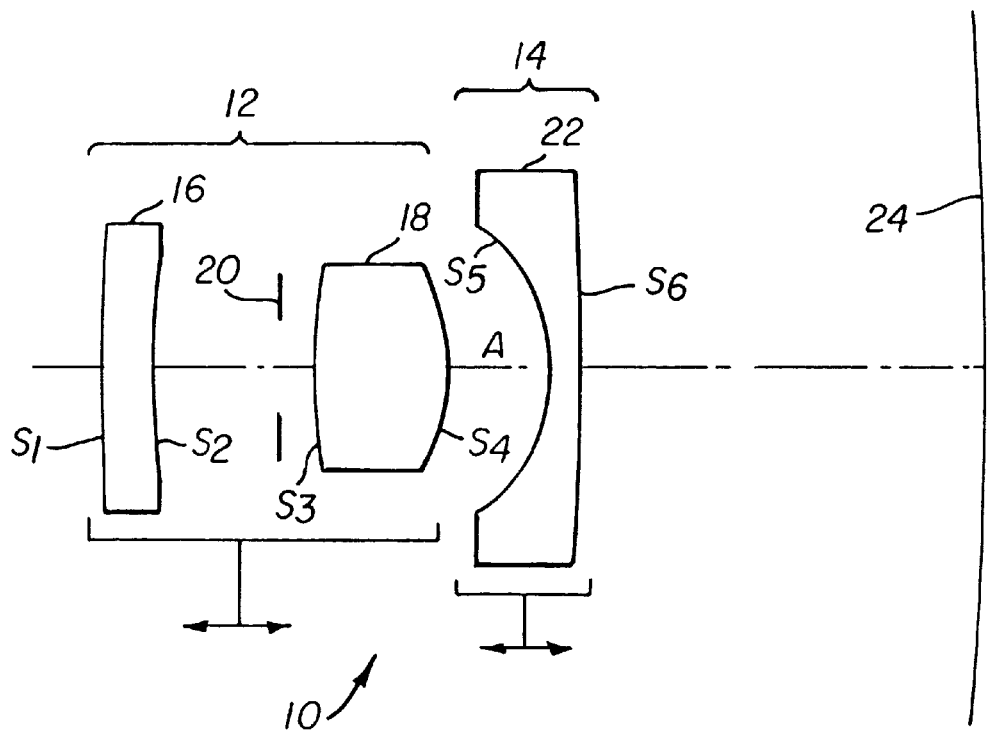
FIG. 1B is a cross sectional view of a first and second embodiment made in accordance with the present invention in a mid zoom position.
Figure 1C:
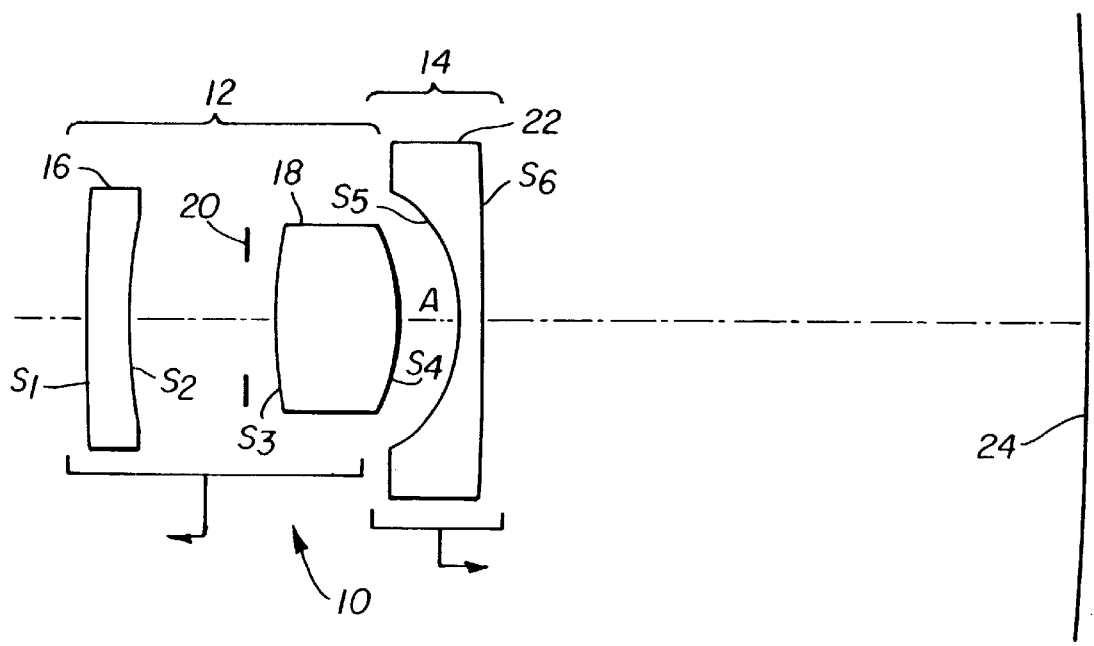
FIG. 1C is a cross sectional view of a first and second embodiment made in accordance with the present invention in a telephoto zoom position.

Referring to FIGS. 1A–1C, a variable focal length zoom lens 10 includes a positive power first group 12 and a negative power second group 14. The first group 12 includes a first lens element 16 and a second lens element 18 with a variable iris 20 having a mechanical aperture positioned between the first lens element 16 and the second lens element 18. The second group includes a third lens element 22.

During zooming, the first group 12 and the second group 14 move relative to one another and move relative to and a curved image plane 24, often referred to as a film plane. The location of the first lens element 16 relative to the location of the second lens element is fixed within the first lens group 12. As such, the air gap between the first lens element 16 and the second lens element 18 does not change during zooming.

The mechanical aperture of the variable iris 20 of the first lens group 12 changes depending on focal length and f/stop. However, light passing through the zoom lens 10 is not cut off or reduced by any other apertures as the zoom lens 10 experiences no vignetting.

As viewed from an object side of the lens, the first group 12 includes the first lens element 16 having surfaces $S_1$ and $S_2$ and the second lens element 18 having surfaces $S_3$ and $S_4$. The overall power of the first group 12 is positive due primarily to the positive power of the spherical glass second lens element 18. The first lens element 16 is a substantially zero power plastic element having at least one aspherical surface (either $S_1$ or $S_2$, or both $S_1$ and $S_2$) whose principal contribution to the zoom lens 10 is aberration correction which helps to maximize the performance of the zoom lens 10. As a result, the zoom lens 10 is highly corrected for the aberration of astigmatism. Additionally, the zoom lens is highly corrected for spherical aberration at the wide angle and telephoto zoom positions. The third lens element 22 of the second group 14 includes a spherical, negative power glass element having surfaces $S_5$ and $S_6$.

The power of the first lens element 16 is held to a near neutral condition in order to reduce any image plane 24 position change due to the thermal reaction of the plastic first lens element 16 to environmental temperature changes which minimizes image quality degradation. Additionally, the weak positive power of the first lens element 16 of the first lens group 12 allows the first lens element 16 to be made from a polystyrene or polycarbonate material and still not contribute to a system focal length change due to a change in the temperature of the operating environment.

In FIGS. 1A–1C, the first lens element 16 is a meniscus lens having its concave surface facing the image plane 24. Details of the lens prescriptions for examples 1 through 3 are discussed below. Each of the examples 1 and 2 is designed with a unique curvature to the image plane 24 also listed below.

Figure 2A:
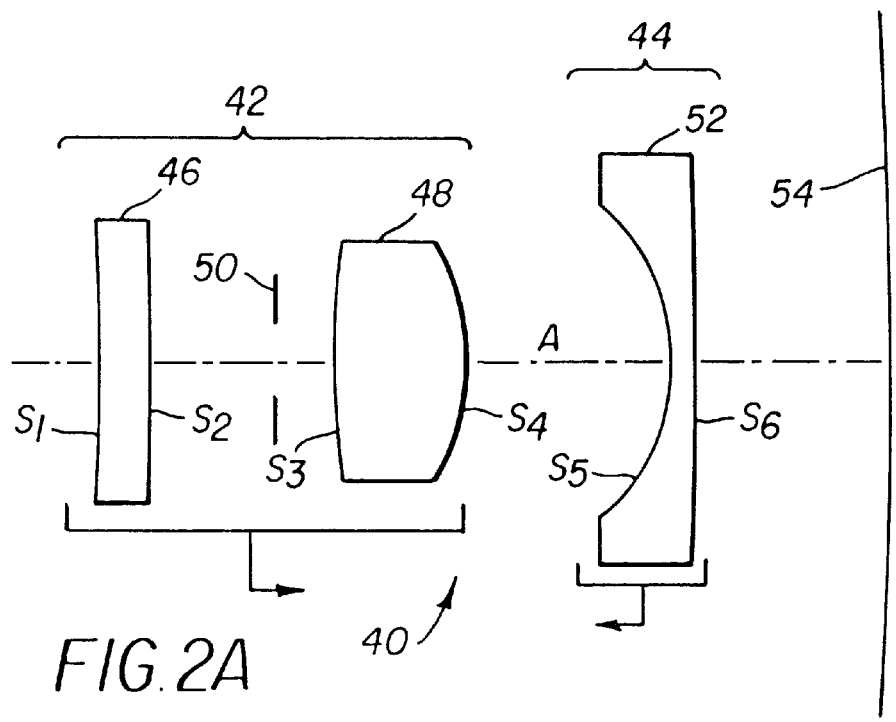
FIG. 2A is a cross sectional view of a third and fourth embodiment made in accordance with the present invention in a wide angle zoom position.
Figure 2B:
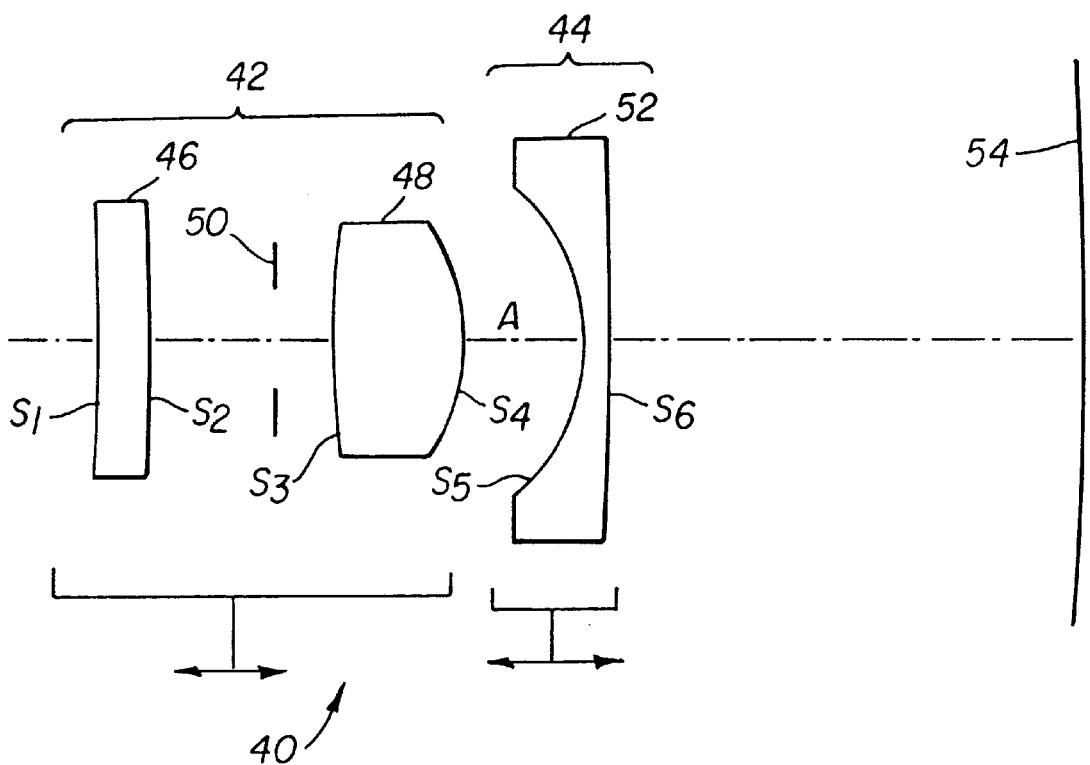
FIG. 2B is a cross sectional view of a third and fourth embodiment made in accordance with the present invention in a mid zoom position.
Figure 2C:
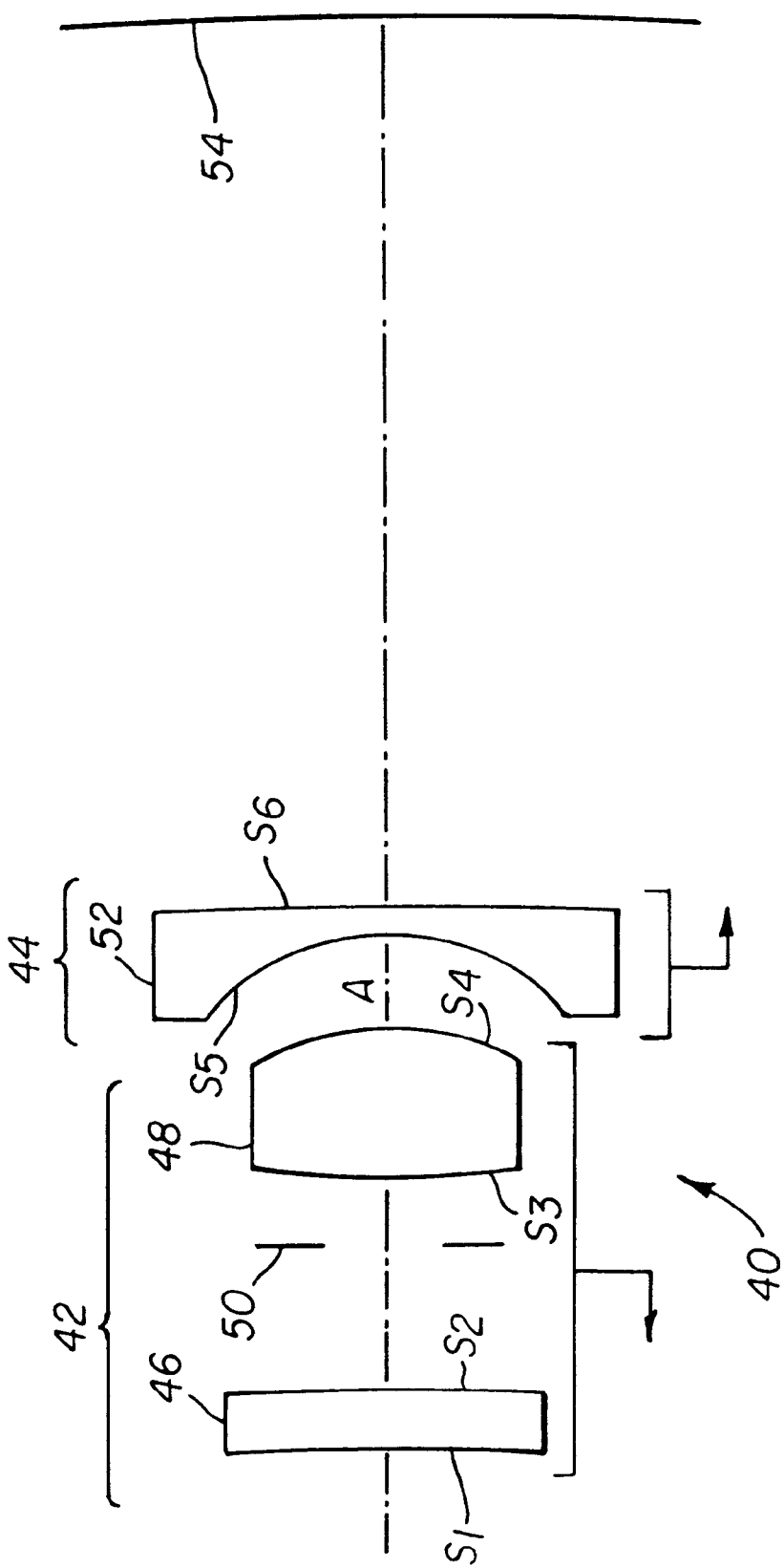
FIG. 2C is a cross sectional view of a third and fourth embodiment made in accordance with the present invention in a telephoto zoom position.

Referring to FIGS. 2A–2C, a variable focal length zoom lens 40 includes a positive power first group 42 and a negative power second group 44. The first group 42 includes a first lens element 46 and a second lens element 48 with a variable iris 50 having a mechanical aperture positioned between the first lens element 46 and the second lens element 48. The second group 44 includes a third lens element 52.

During zooming, the first group 42 and the second group 44 move relative to one another and move relative to and a curved image plane 54, often referred to as a film plane. The location of the first lens element 46 relative to the location of the second lens element is fixed within the first lens group 42. As such, the air gap between the first lens element 46 and the second lens element 48 does not change during zooming.

The mechanical aperture of the variable iris 50 of the first lens group 52 changes depending on focal length and f/stop. However, light passing through the zoom lens 40 is not cut off or reduced by any other apertures as the zoom lens 40 experiences no vignetting.

As viewed from an object side of the lens, the first group 42 includes the first lens element 46 having surfaces $S_1$ and $S_2$ and the second lens element 48 having surfaces $S_3$ and $S_4$. The overall power of the first group 42 is positive due primarily to the positive power of the spherical glass second lens element 48. The first lens element 46 is a substantially zero power plastic element having at least one aspherical surface (either $S_1$ or $S_2$, or both $S_1$ and $S_2$) whose principal contribution to the zoom lens 40 is aberration correction which helps to maximize the performance of the zoom lens 40. As a result, the zoom lens 40 is highly corrected for the aberration of astigmatism. Additionally, the zoom lens is highly corrected for spherical aberration at the wide angle and telephoto zoom positions. The third lens element 52 of the second group 44 includes a spherical, negative power glass element having surfaces $S_5$ and $S_6$ as viewed from a object side of the lens.

The power of the first lens element 46 is held to a near neutral condition in order to reduce any image plane 54 position change due to the thermal reaction of the plastic first lens element 46 to environmental temperature changes. This minimizes image quality degradation. Additionally, the weak positive power of the first lens element 46 of the first lens group 42 allows the first lens element 46 to be made from a polystyrene or polycarbonate material and still not contribute to a system focal length change due to a change in the temperature of the operating environment.

In FIGS. 2A–2C, the first lens element 46 is a meniscus lens having 5its convex surface facing the image plane 54. Details of the lens prescription for example 4 are discussed below. Examples 3 and 4 is designed with a unique curvature to the image plane 54 also listed below.

In each of the following examples, dimensions are in mm and indices and dispersions (V) are for the d line of the spectrum. The surfaces are numbered from the object side. Additionally, image radii are for a cylindrical image (film) plane and the long dimension of image format is measured along a cylinder radius of curvature.

EXAMPLE 1
(FIGS. 1A–1C)

| Surface | Radius | Thickness | Index | V |
| --- | --- | --- | --- | --- |
| $S_1$ | asphere | 3 | 1.590 | 30.9 |
| $S_2$ | 94.58052 | 7.95 | | |
| STOP | diaphragm | 2.737 | | |
| $S_3$ | 28.5354 | 8.5 | 1.516 | 64.1 |
| $S_4$ | −13.93 | A | | |
| $S_5$ | −10.7888 | 2 | 1.532 | 48.9 |
| $S_6$ | infinity | | | |

-continued

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

Surface $S_1$:

| | | | |
|---|---|---|---|
| C = 0.01059276 | D = −0.3419951E−04 | F = −0.1222661E−07 | H = −0.3535696E−11 |
| k = 0 | E = 0.2790696E−06 | G = 0.2959716E−09 | I = 0.1613439E−13 |

| Focal Length | Back Focus | Front Focus | Best Focus | Zoom Spacing (A) | Lens Length | Stop Diameter | Relative Aperture |
|---|---|---|---|---|---|---|---|
| 30.60 | 10.011 | 32.59 | −0.175 | 10.131 | 34.318 | 3.79 | 8.00 |
| 44.70 | 24.529 | 46.28 | −0.400 | 6.049 | 30.236 | 4.67 | 9.50 |
| 58.80 | 39.044 | 59.97 | 0.171 | 3.925 | 28.112 | 5.31 | 11.00 |

Example 1 has a curved image plane (radius=−327.59) with a semi-field that varies from 36.02° to 20.41° and and a semi-diagonal of 21.63 (Illum.), 20.58 (Image). The first lens element 16 has a focal length of 11,584.726, the second lens element 18 has a focal length of 19.386, and the third lens element 22 has a focal length of −20.192. The first group 12 has a focal length of 19.611. Example 1 has only one aspheric surface ($S_1$) which reduces tooling costs associated with manufacturing this lens element. Although its performance varies slightly (as measured by MTF), the zoom lens of Example 1 performs substantially similar to Examples 2–4, discussed below. Additionally, the zoom lens of Example 1 does not require on camera auto focus correction.

Figure 3A:
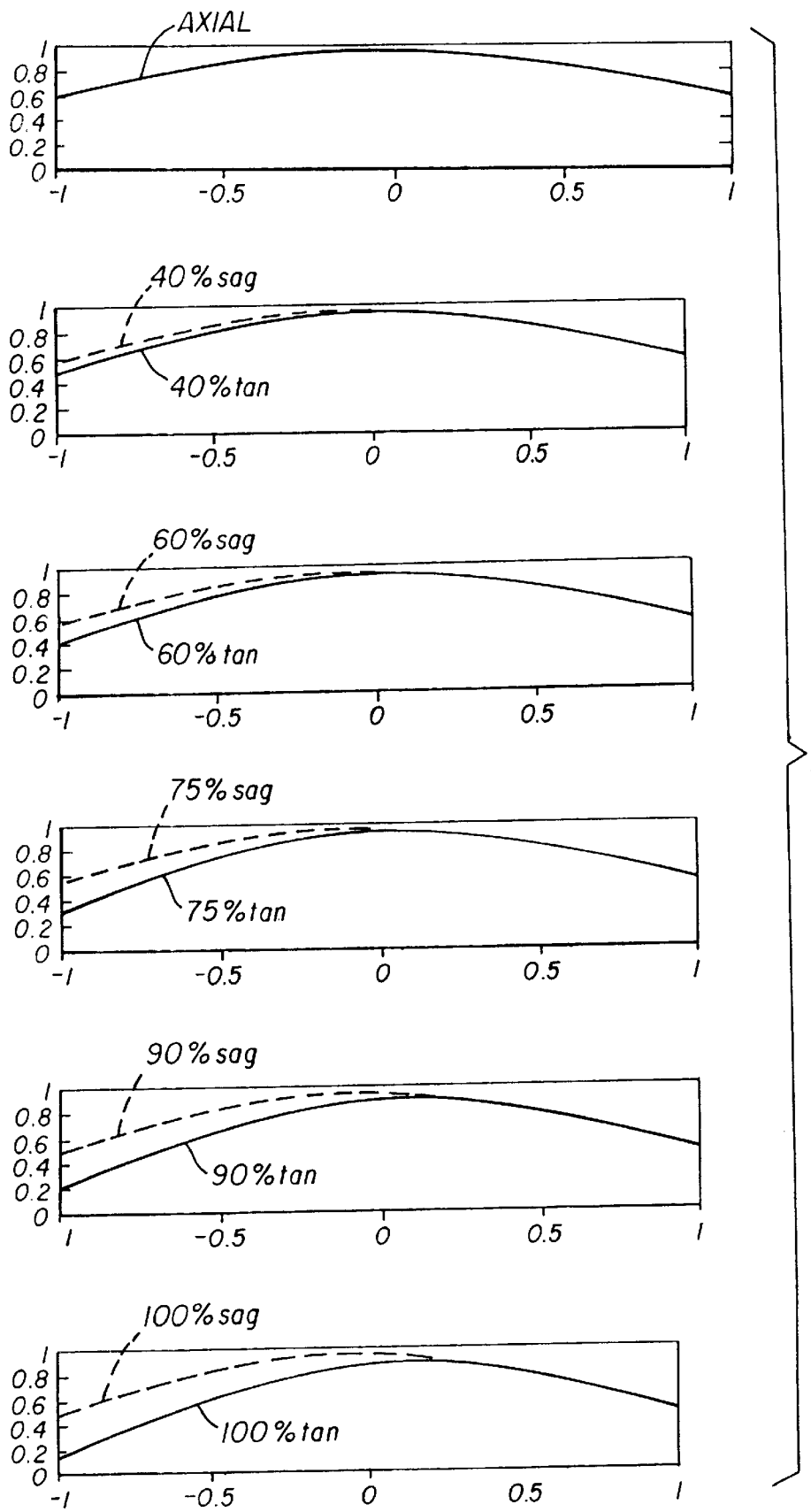
FIGS. 3A–3C are MTF performance plots of the first embodiment at various field zones in a wide angle, mid zoom, and telephoto position, respectively.
Figure 3B:
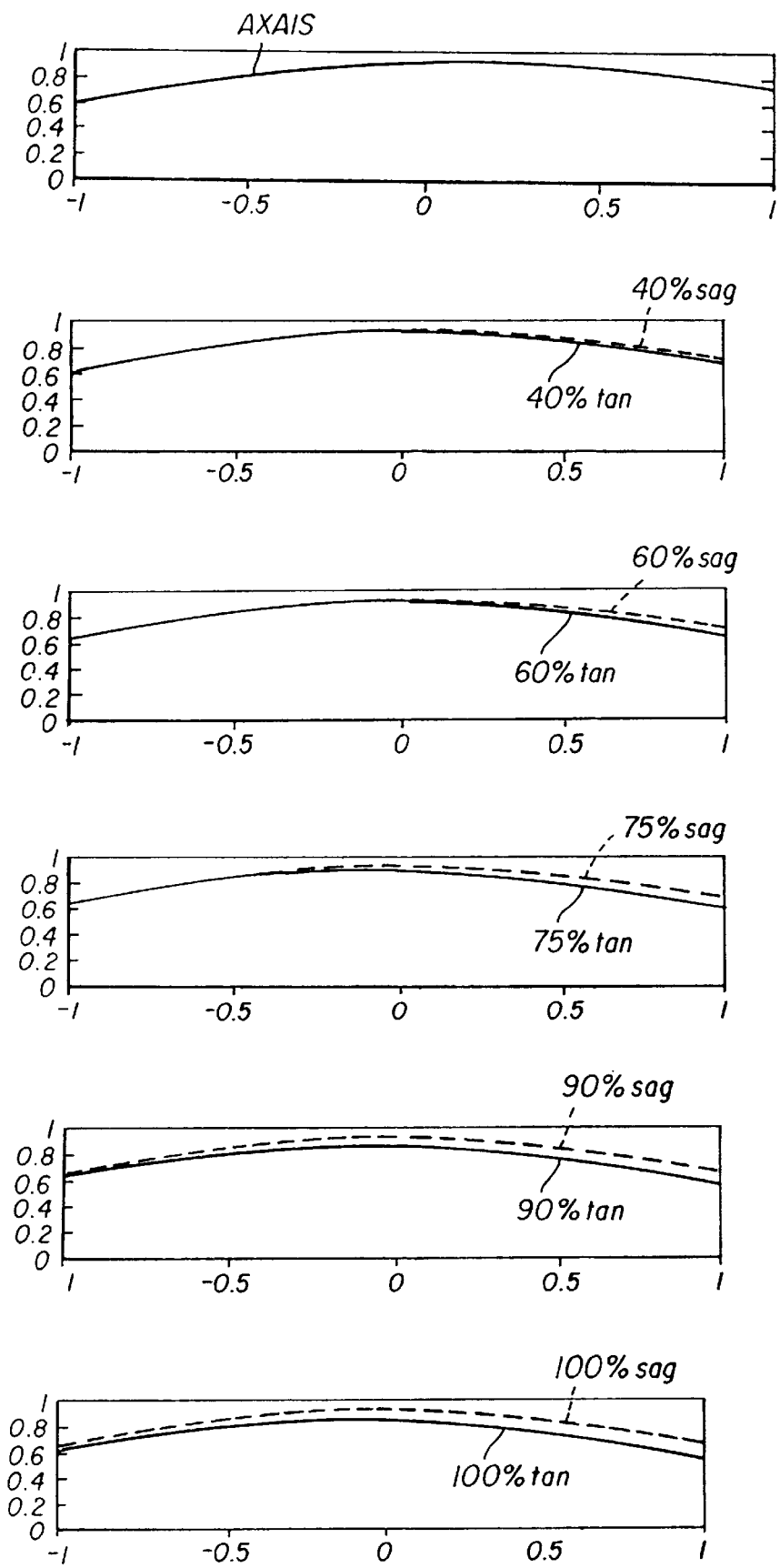
Figure 3C:
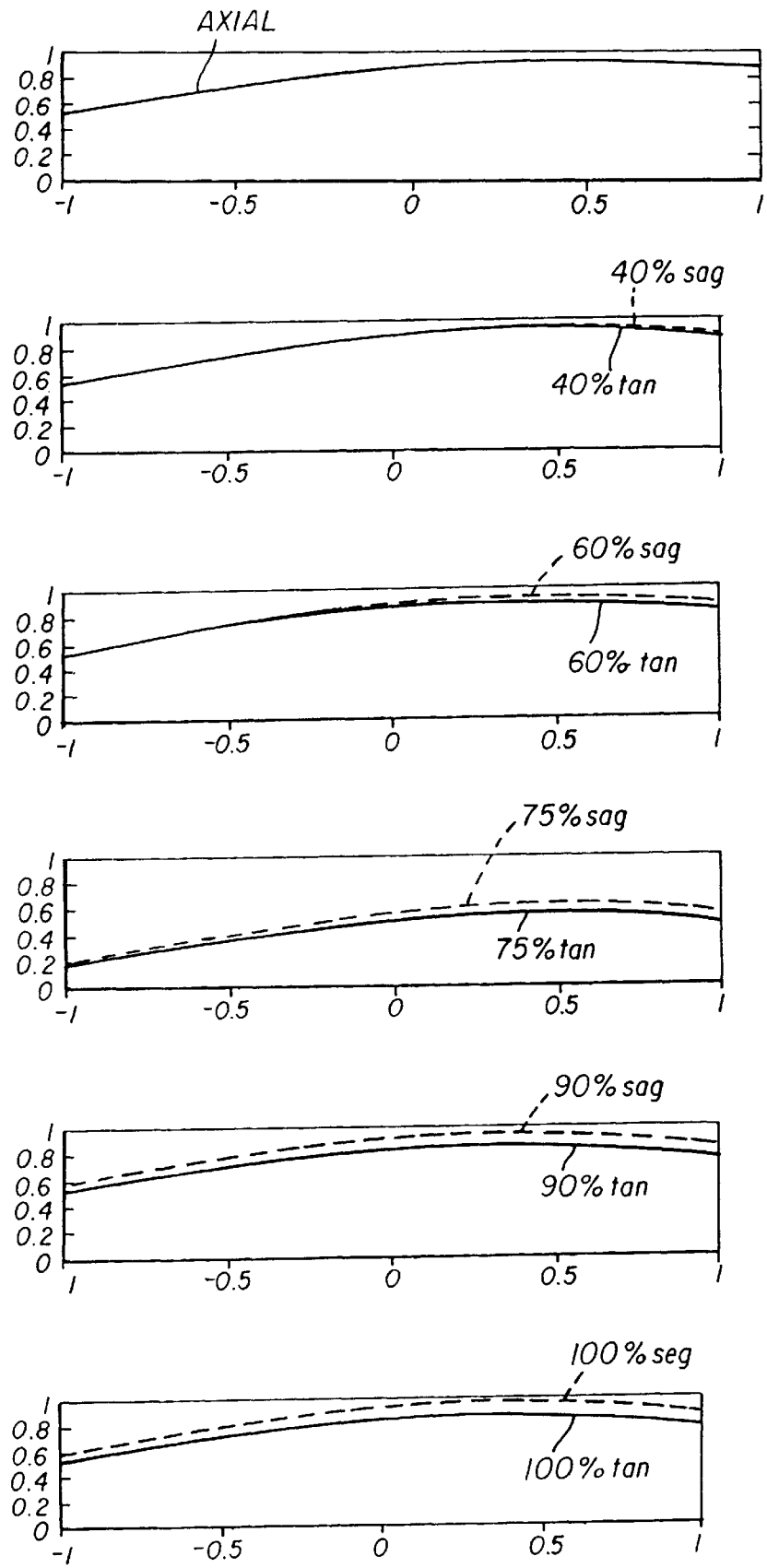

Referring to FIGS. 3A–3C, the MTF performance plots are measured at best focus using weighted wavelengths (486 nanometers at 15%, 546 nanometers at 50%, and 656 nanometers at 35%) at a frequency of 5 cycles per millimeter with full field being 20.58 mm (100%=20.58 mm). Additionally, FIGS. 7A–7C and FIGS. 11A–11C describe the performance of the zoom lens 10 of Example 1.

EXAMPLE 2

(FIGS. 1A–1C)

| Surface | Radius | Thickness | Index | V |
|---|---|---|---|---|
| $S_1$ | asphere | 3.320 | 1.590 | 30.9 |
| $S_2$ | asphere | 7.886 | | |
| STOP | diaphragm | 1.917 | | |
| $S_3$ | 30.7474 | 8.5 | 1.517 | 64.2 |
| $S_4$ | −13.4631 | A | | |
| $S_5$ | −10.6706 | 1.6 | 1.532 | 48.8 |
| $S_6$ | −214.880 | | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

Surface $S_1$:

| | | | |
|---|---|---|---|
| C = 0.0027823 | D = −2.08203e−005 | F = 1.430412e−008 | H = 5.213367e−012 |
| k = 0 | E = 2.536015e−007 | G = −4.306787e−010 | I = −2.407614e−014 |

Surface $S_2$:

| | | | |
|---|---|---|---|
| C = 0.0070085 | D = 1.989713e−005 | F = 5.116069e−008 | H = 3.321462e−011 |
| k = 0 | E = 1.91235e−007 | G = −1.918757e−009 | I = −2.255516e−013 |

| Focal Length | Back Focus | Front Focus | Best Focus | Zoom Spacing (A) | Lens Length | Stop Diameter | Relative Aperture |
|---|---|---|---|---|---|---|---|
| 30.00 | 10.00 | 31.35 | −0.147 | 11.229 | 34.452 | 3.82 | 8.00 |
| 45.00 | 26.09 | 45.34 | −0.780 | 6.628 | 29.851 | 5.76 | 8.00 |
| 60.00 | 42.17 | 59.32 | 0.084 | 4.328 | 27.551 | 7.72 | 8.00 |

Example 2 has a curved image plane (radius=−280) with a semi-field that varies from 20.17° to 36.54° and a semi-diagonal of 21.63 (Illum.), 20.58 (Image). The first lens element 16 has a focal length of −400.000, the second lens element 18 has a focal length of 19.319, and the third lens element 22 has a focal length of −21.072. The first group 12 has a focal length of 19.650. Example 2 has two aspheric surfaces ($S_1$ and $S_2$) on the first lens element 16.

Additionally, the zoom lens of Example 2 does not require on camera auto focus correction.

Figure 4A:
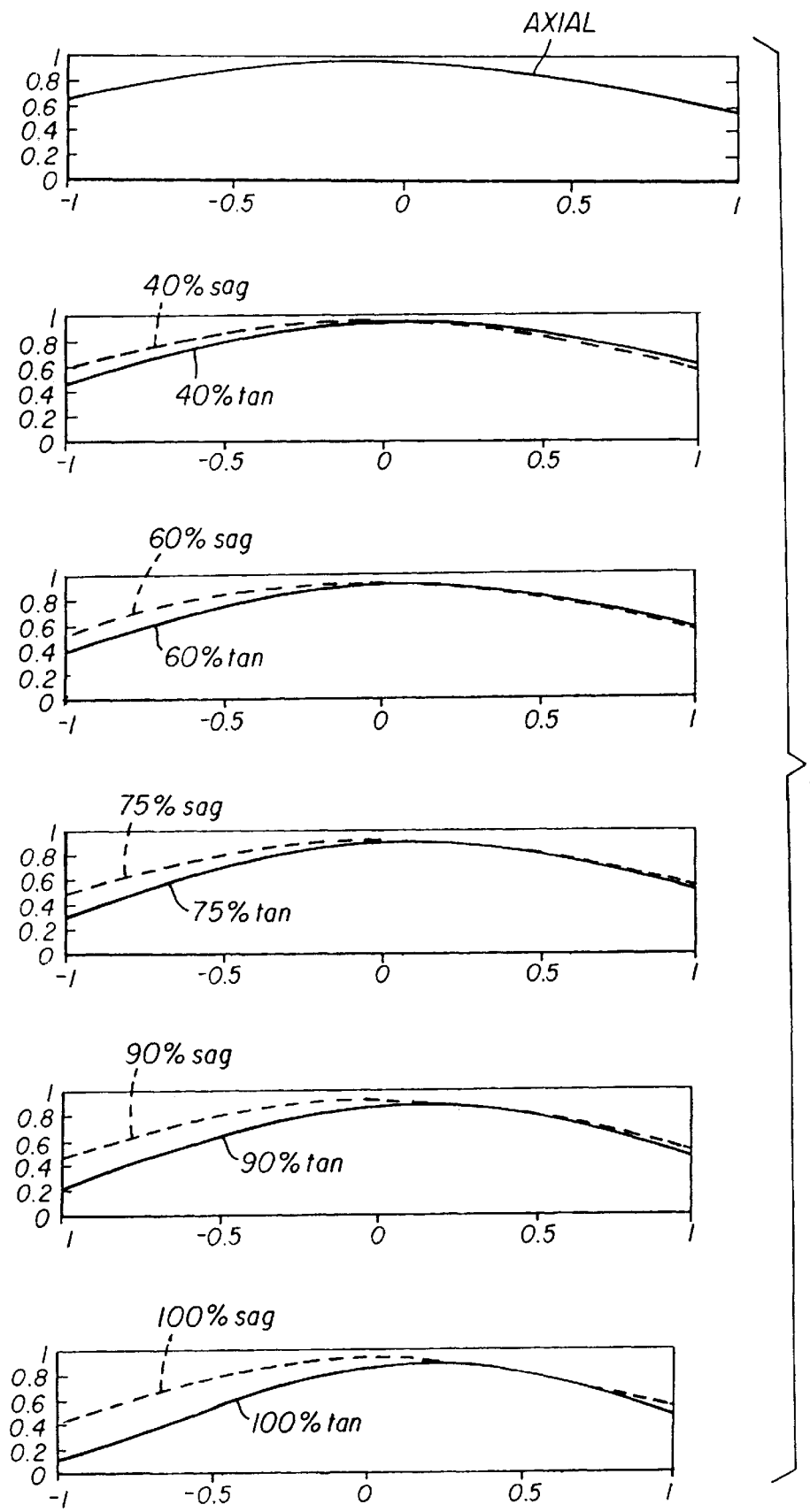
FIGS. 4A–4C are MTF performance plots of the second embodiment at various field zones in a wide angle, mid zoom, and telephoto position, respectively.
Figure 4B:
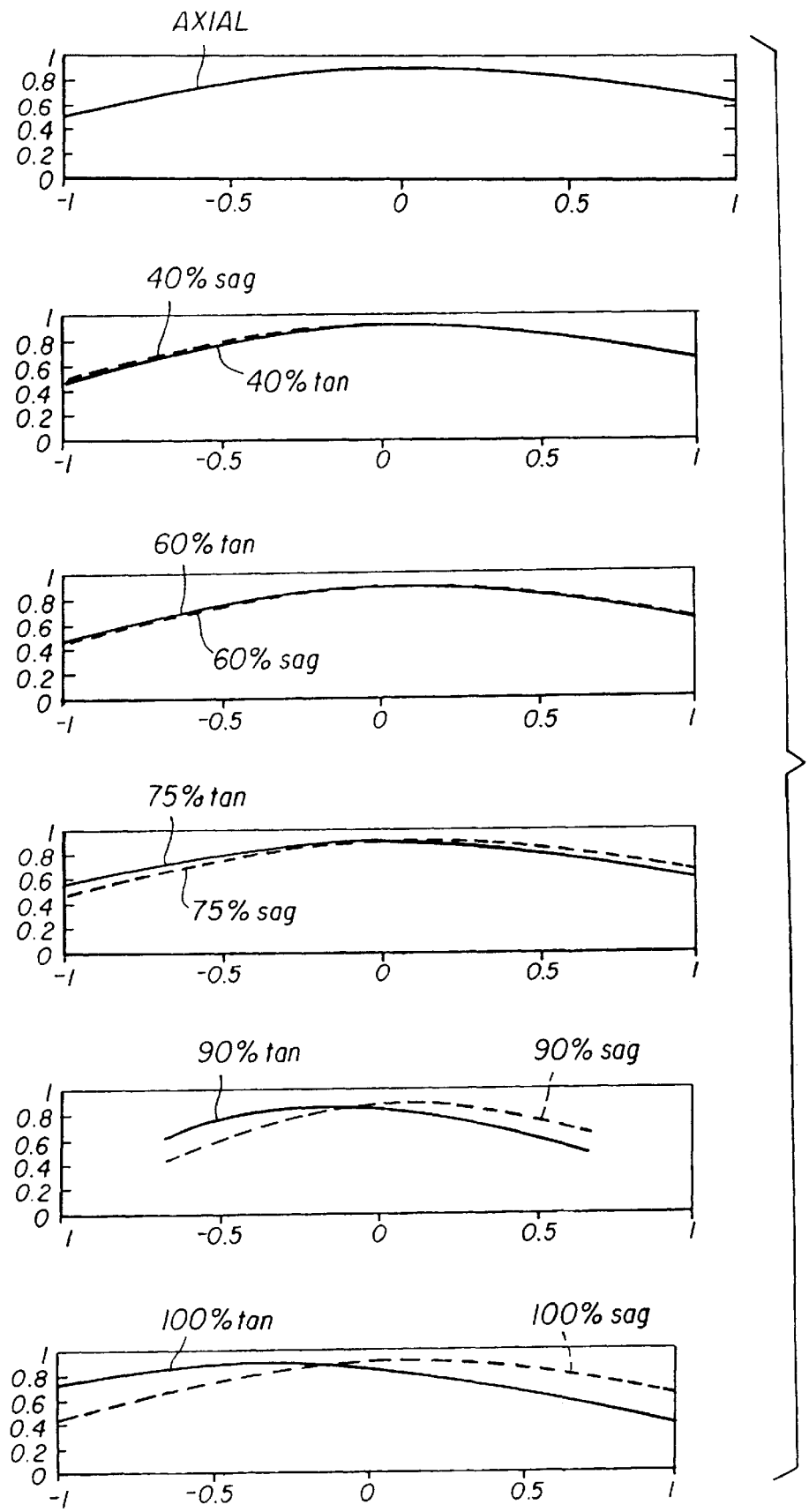
Figure 4C:
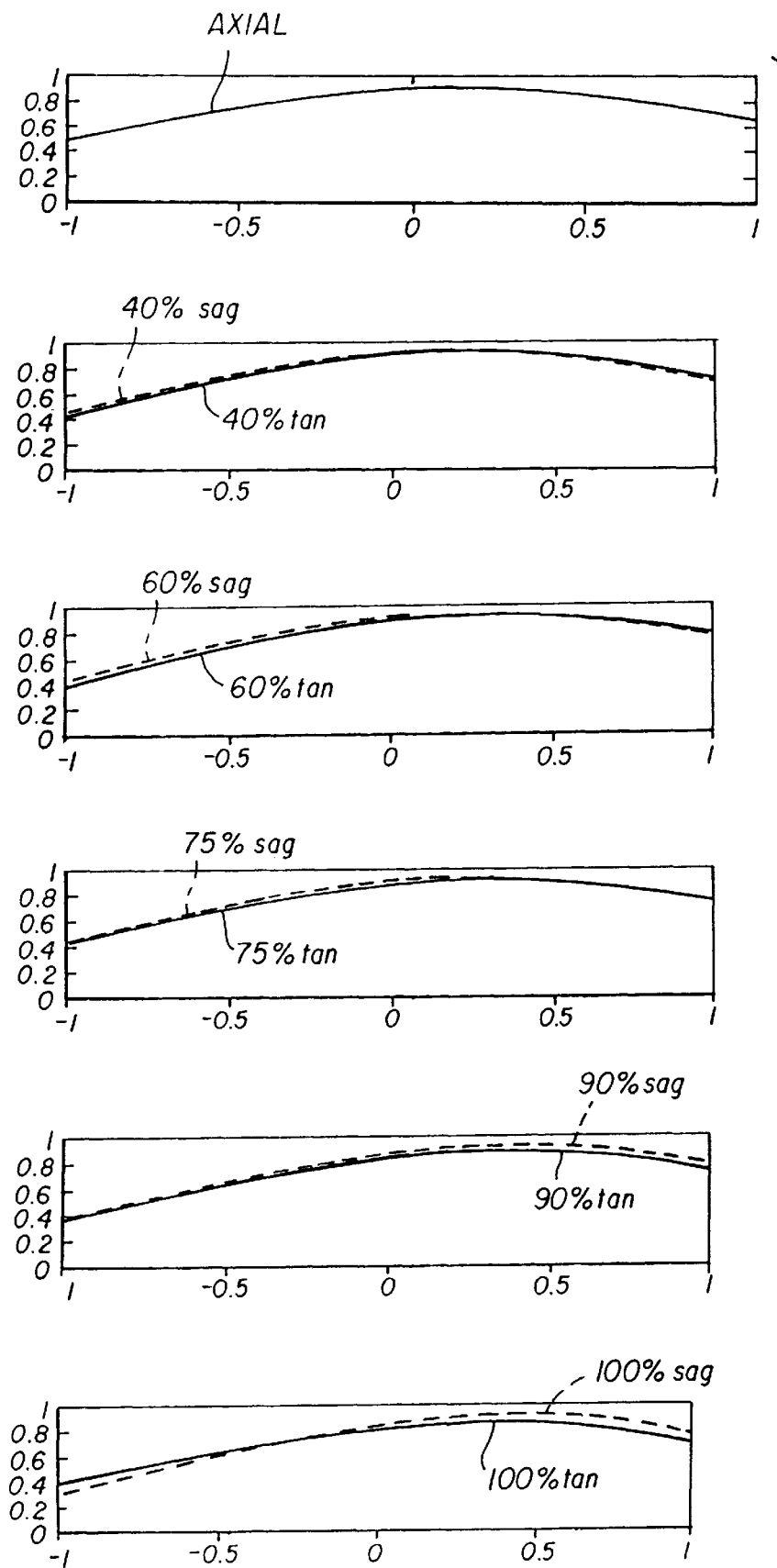

Referring to FIGS. 4A–4C, the MTF performance plots are measured at best focus using weighted wavelengths (486 nanometers at 15%, 546 nanometers at 50%, and 656 nanometers at 35%) at a frequency of 5 cycles per millimeter with full field being 20.58 mm (100%=20.58 mm). Additionally, FIGS. 8A–8C and FIGS. 12A–12C describe the performance of the zoom lens 10 of Example 2.

EXAMPLE 3
(FIGS. 2A–2C)

| Surface | Radius | Thickness | Index | V |
|---|---|---|---|---|
| $S_1$ | asphere | 3.320 | 1.590 | 30.9 |
| $S_2$ | asphere | 6.903 | | |
| STOP | diaphragm | 1.97 | | |
| $S_3$ | 31.922 | 8.5 | 1.516 | 64.1 |
| $S_4$ | −12.7685 | A | | |
| $S_5$ | −10.2526 | 2.12 | 1.532 | 48.9 |
| $S_6$ | −423.736 | | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

Surface $S_1$:

C = −0.0125646  D = −3.089281e-005  F = −1.899357e-009  H = 0
k = 0           E = 7.189489e-007   G = −1.72253e-011   I = 0

Surface $S_2$:

C = −0.0125148  D = 1.499608e-005   F = 6.170526e-009   H = 0
k =             E = 8.161403e-007   G = −1.572474e-010  I = 0

| Focal Length | Back Focus | Front Focus | Best Focus | Zoom Spacing (A) | Lens Length | Stop Diameter | Relative Aperture |
|---|---|---|---|---|---|---|---|
| 28.56 | 9.256 | 30.30 | −0.151 | 10.191 | 33.004 | 3.63 | 8.00 |
| 41.72 | 23.256 | 42.68 | −0.378 | 6.160 | 28.973 | 4.48 | 9.50 |
| 54.88 | 37.251 | 55.05 | 0.050 | 4.063 | 26.876 | 5.09 | 11.00 |

Example 3 has a curved image plane (radius=−280) with a semi-field that varies from 21.87° to 37.77° and a semi-diagonal of 21.63 (Illum.), 20.58 (Image). The first lens element 46 has a focal length of 11,602.802, the second lens element 48 has a focal length of 18.820, and the third lens element 52 has a focal length of −19.700. The first group 42 has a focal length of 19.523. Example 3 has two aspheric surfaces ($S_1$ and $S_2$) on the first lens element 46. Additionally, the zoom lens of Example 3 does not require on camera auto focus correction.

Figure 5A:
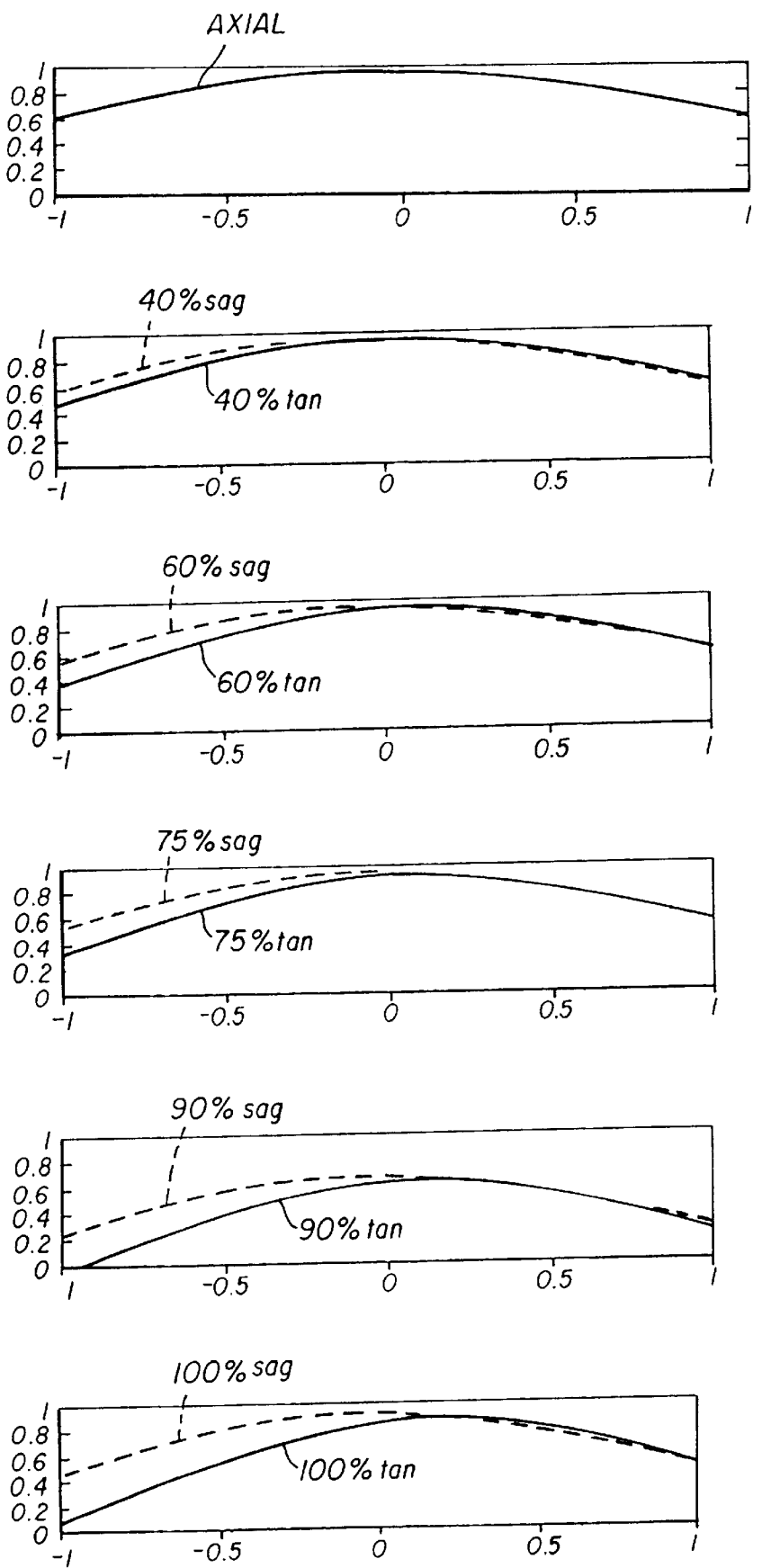
FIGS. 5A–5C are MTF performance plots of the third embodiment at various field zones in a wide angle, mid zoom, and telephoto position, respectively.
Figure 5B:
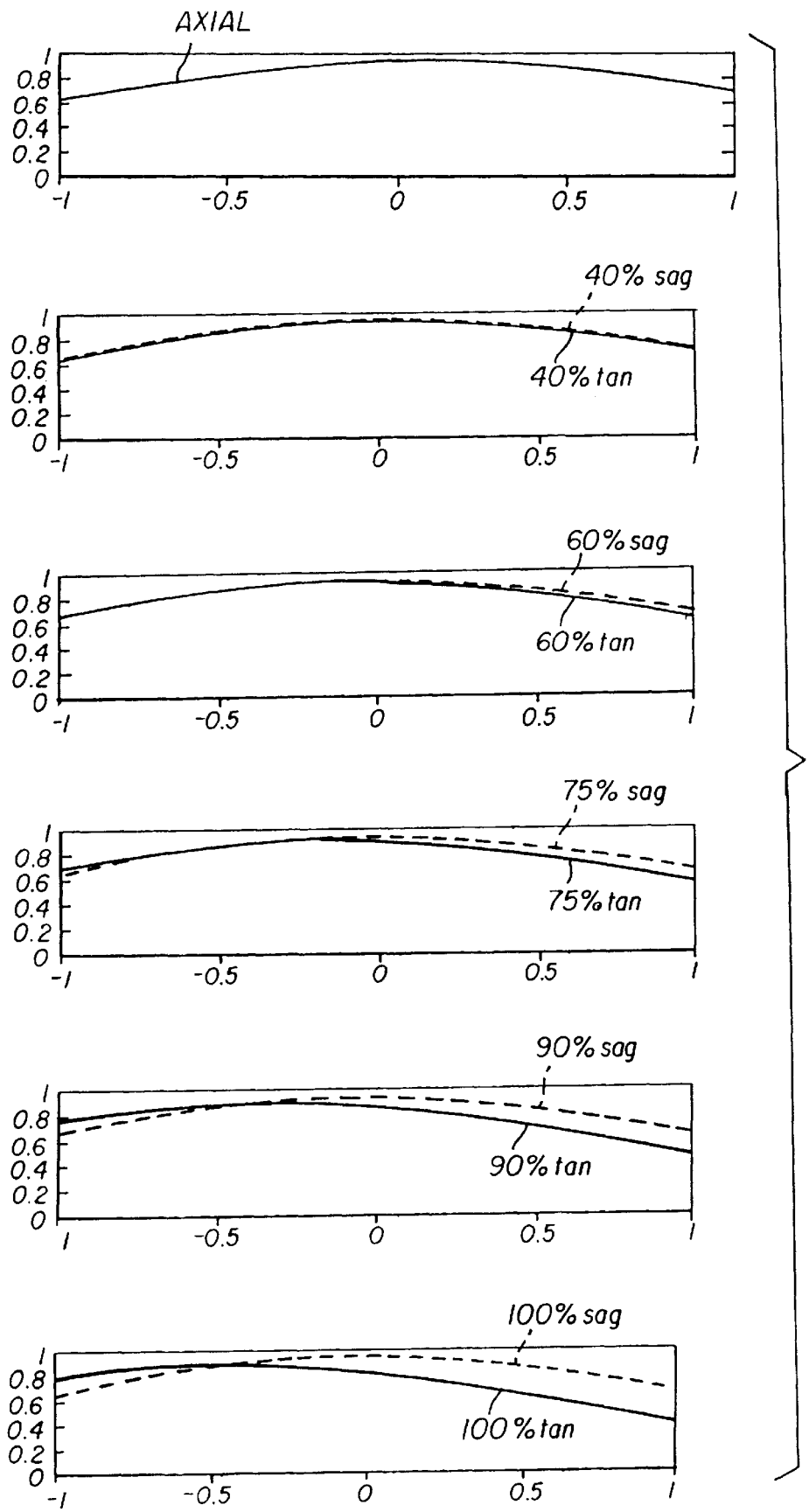
Figure 5C:
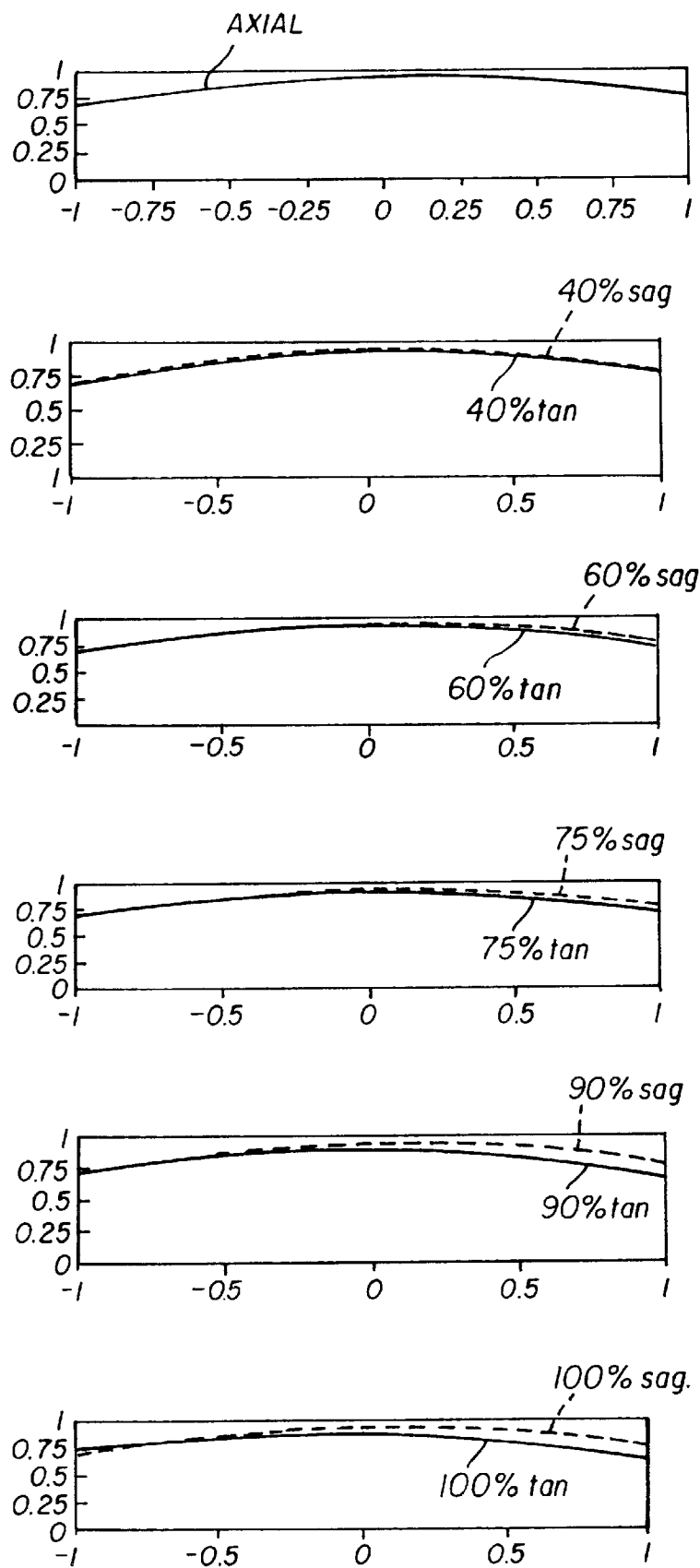

Referring to FIGS. 5A–5C, the MTF performance plots are measured at best focus using weighted wavelengths (486 nanometers at 15%, 546 nanometers at 50%, and 656 nanometers at 35%) at a frequency of 5 cycles per millimeter with full field being 20.58 mm (100%=20.58 mm). Additionally, FIGS. 9A–9C and FIGS. 13A–13C describe the performance of the zoom lens 40 of Example 3.

EXAMPLE 4
(FIGS. 2A–2C)

| Surface | Radius | Thickness | Index | V |
|---|---|---|---|---|
| $S_1$ | asphere | 3.320 | 1.590 | 30.9 |
| $S_2$ | asphere | 7.950 | | |
| STOP | diaphragm | 3.728 | | |
| $S_3$ | 46.1515 | 8.261 | 1.516 | 64.1 |
| $S_4$ | −15.7064 | A | | |
| $S_5$ | −12.9723 | 1.618 | 1.532 | 48.9 |
| $S_6$ | −216.148 | | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14}$$

-continued

Surface S₁:

| | | | |
|---|---|---|---|
| C = −0.0090436 | D = −2.12562e-005 | F = 5.597426e-009 | H = 2.185771e-012 |
| k = 0 | E = 4.122822e-007 | G = −1.732179e-010 | I = −1.314e-014 |

Surface S₂:

| | | | |
|---|---|---|---|
| C = −0.0090034 | D = 4.282486e-006 | F = 4.125799e-009 | H = −7.224068e-0112 |
| k = 0 | E = 5.55882e-007 | G = 1.755683e-010 | I = 4.904076e-014 |

| Focal Length | Back Focus | Front Focus | Best Focus | Zoom Spacing (A) | Lens Length | Stop Diameter | Relative Aperture |
|---|---|---|---|---|---|---|---|
| 35.70 | 12.45 | 37.81 | −0.184 | 13.384 | 38.261 | 4.52 | 8.00 |
| 52.15 | 30.65 | 52.69 | −0.584 | 8.023 | 32.900 | 5.89 | 9.00 |
| 68.60 | 48.83 | 67.56 | 0.059 | 5.234 | 30.111 | 6.34 | 11.00 |

Example 4 has a curved image plane (radius=−280) with a semi-field that varies from 17.76° to 31.90° and a semi-diagonal of 21.63 (Illum.), 20.58 (Image). The first lens element 46 has a focal length of 27,756.048, the second lens element 48 has a focal length of 23.692, and the third lens element 52 has a focal length of −25.901. The first group 42 has a focal length of 23.423. Example 4 has two aspheric surfaces (S₁ and S₂) on the first lens element 46.

Figure 6A:
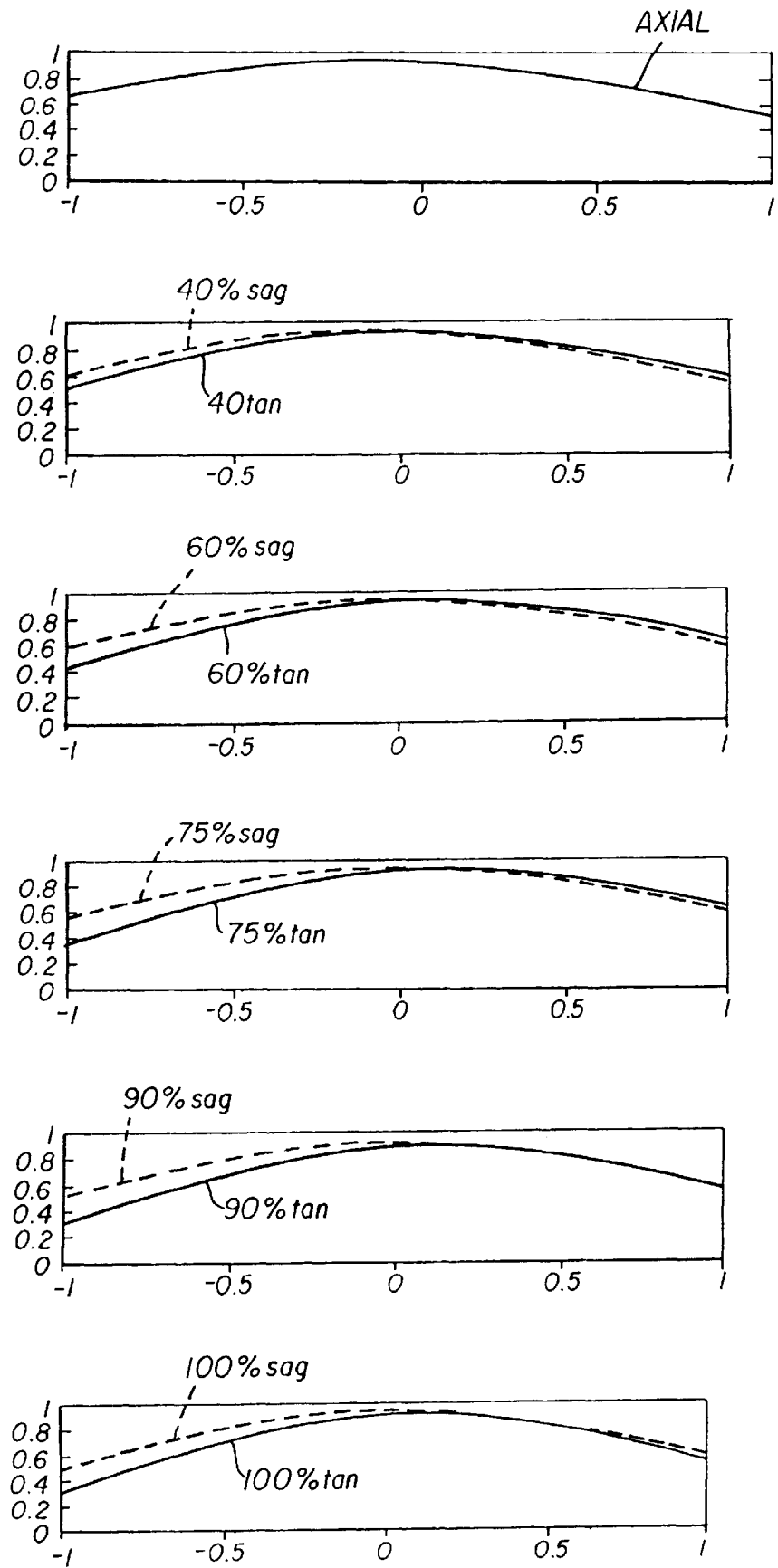
Figure 6B:
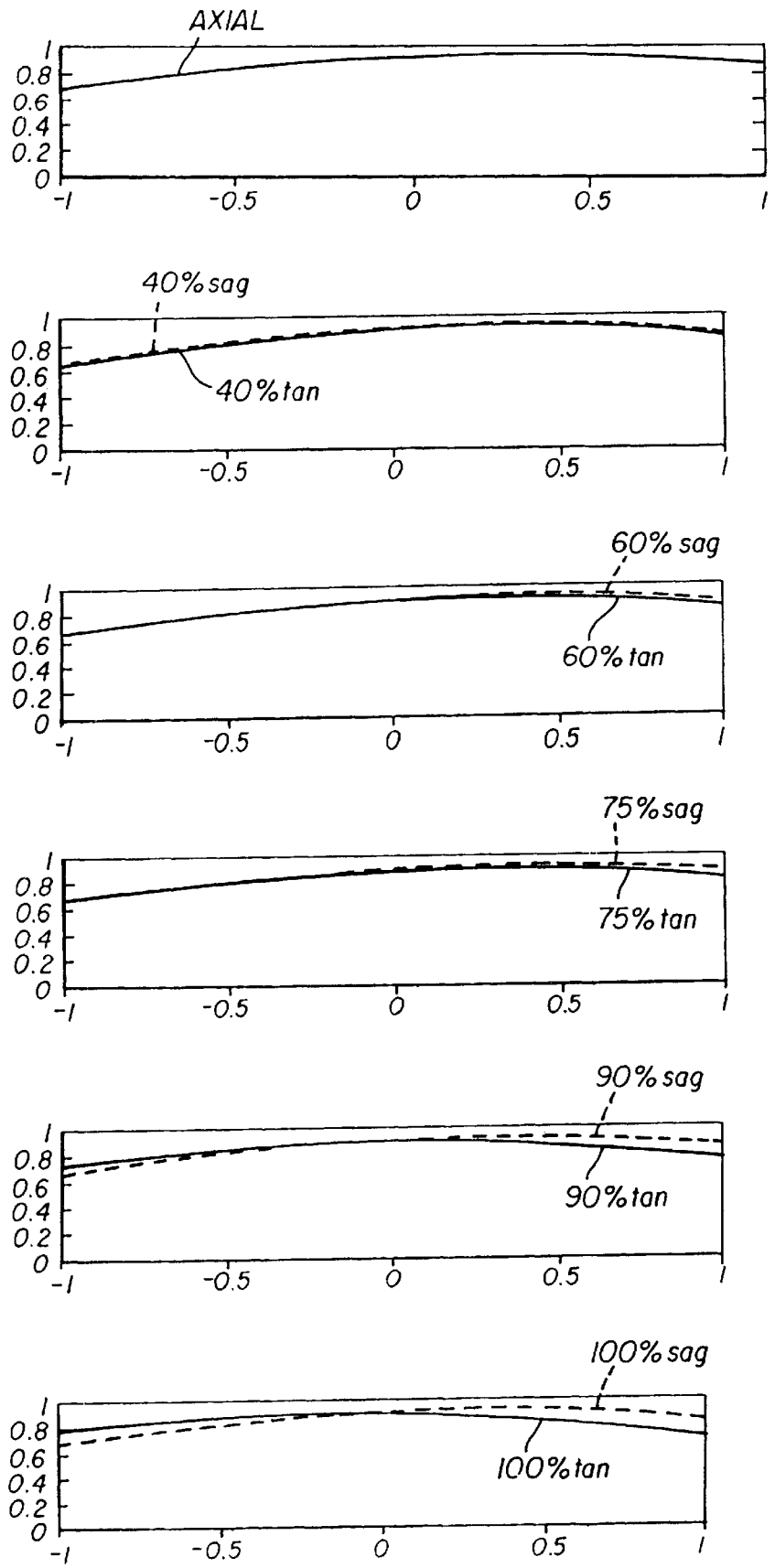
Figure 7A:
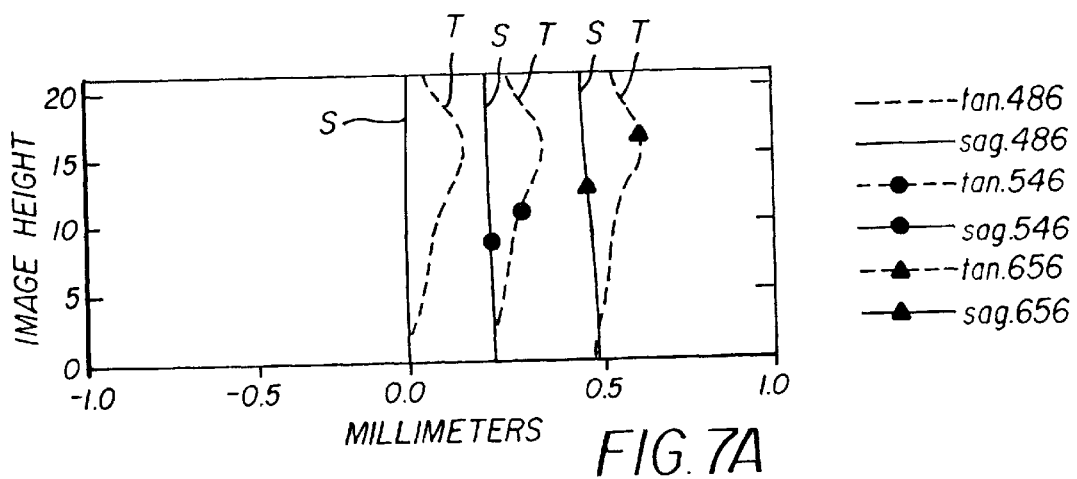
FIGS. 7A–7C are astigmatism aberration curves for the first embodiment at a wide angle, mid zoom, and telephoto position, respectively.
Figure 7B:
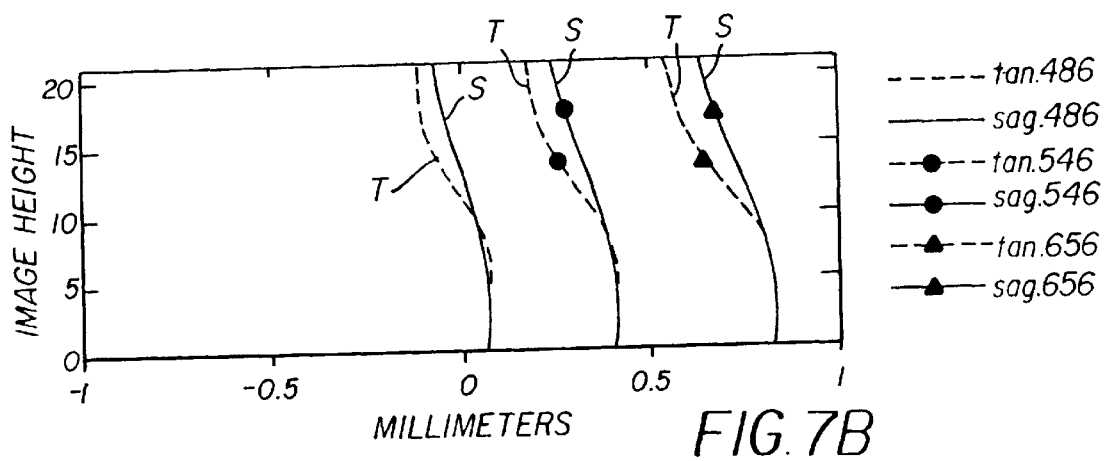
Figure 7C:
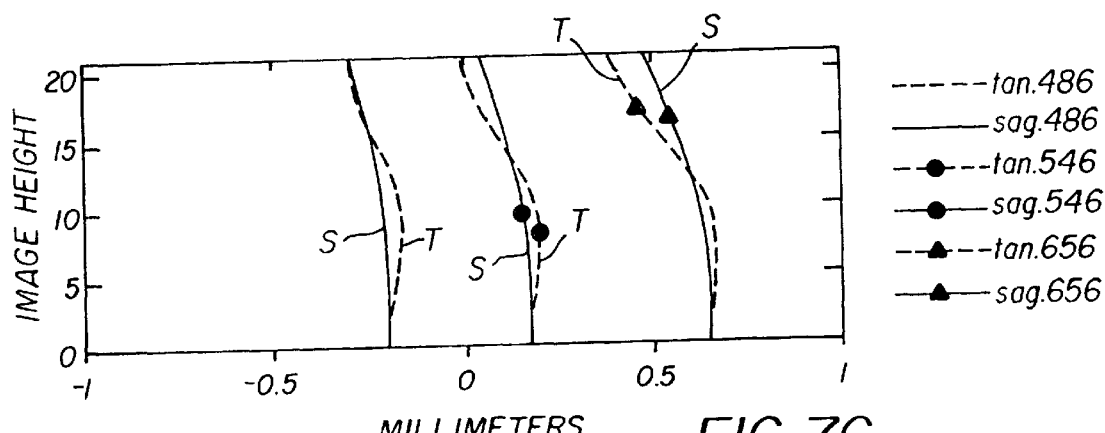
Figure 8A:
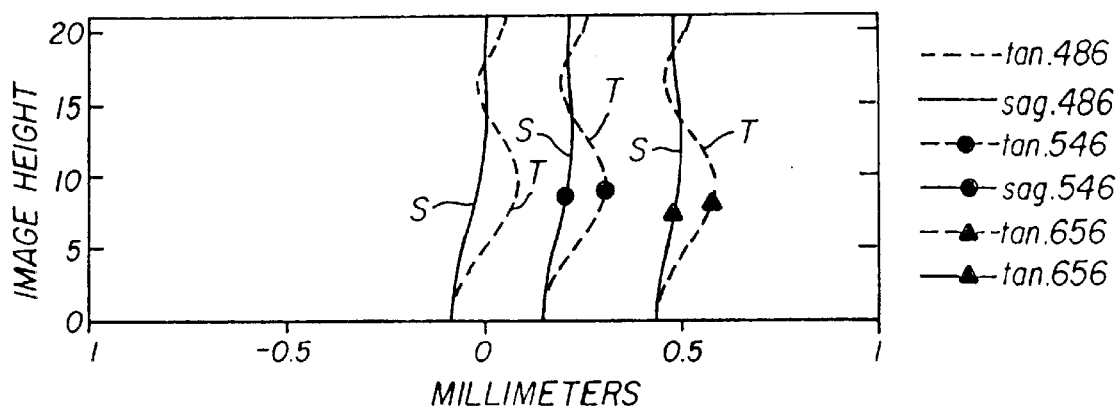
FIGS. 8A–8C are astigmatism aberration curves for the second embodiment at a wide angle, mid zoom, and telephoto position, respectively.
Figure 8B:
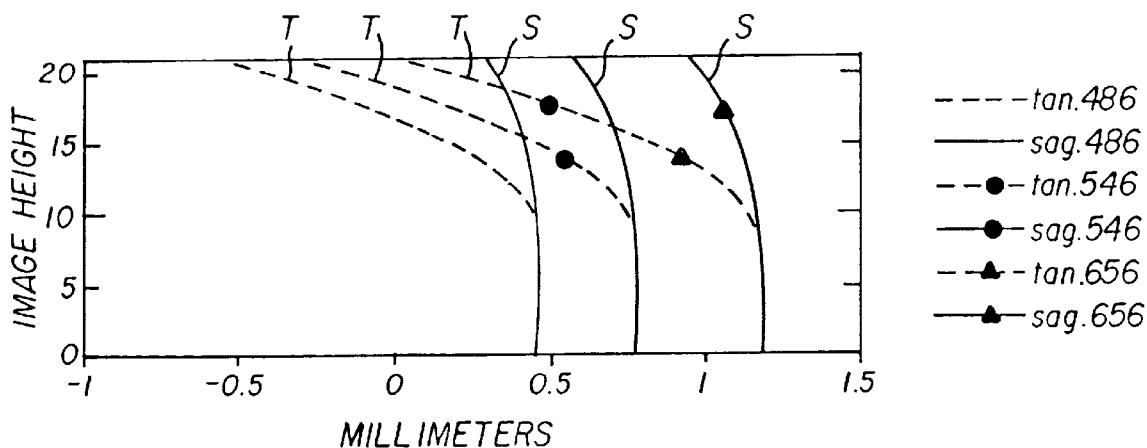
Figure 8C:
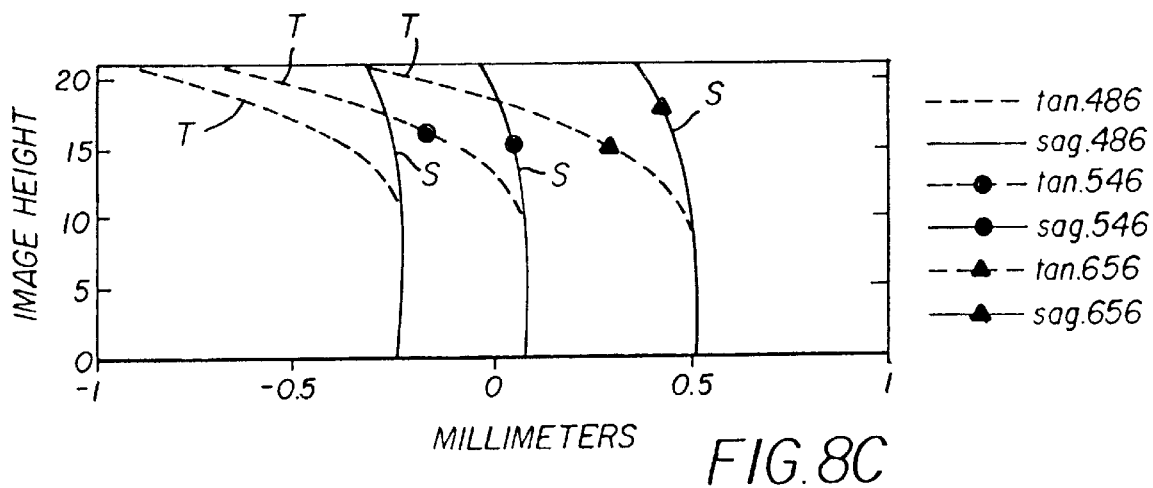
Figure 9A:
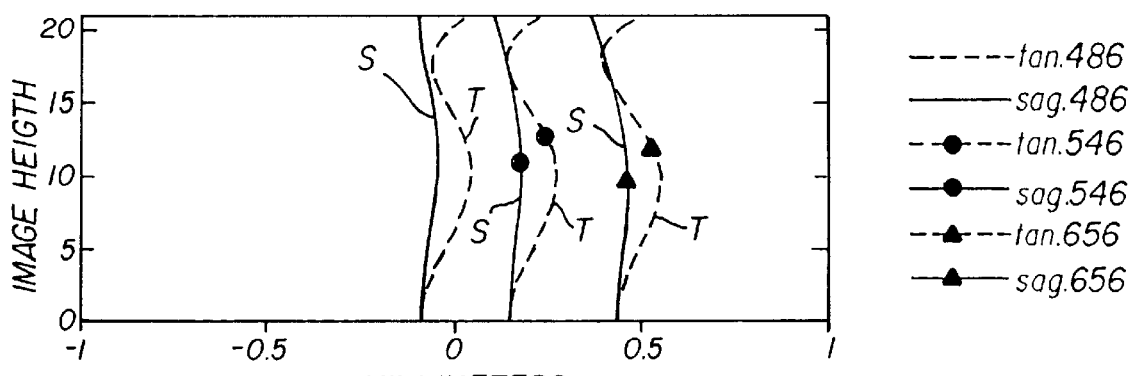
FIGS. 9A–9C are astigmatism aberration curves for the third embodiment at a wide angle, mid zoom, and telephoto position, respectively.
Figure 9B:
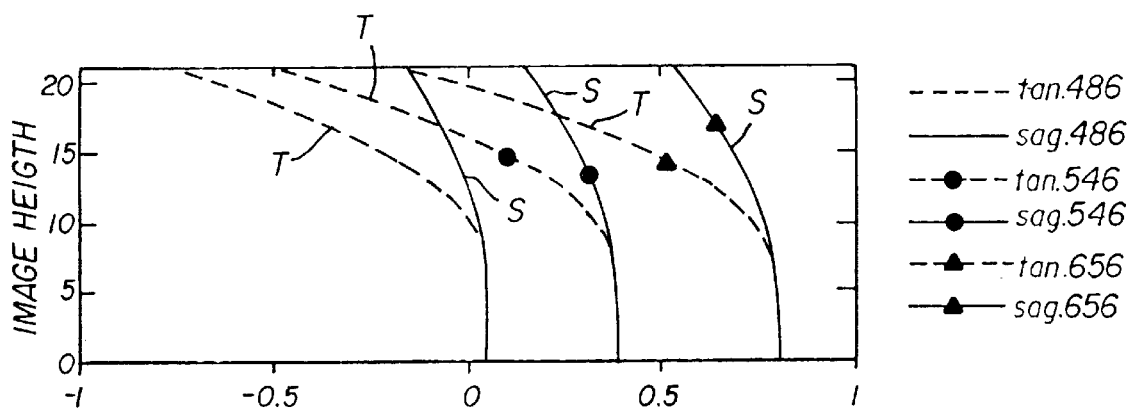
Figure 9C:
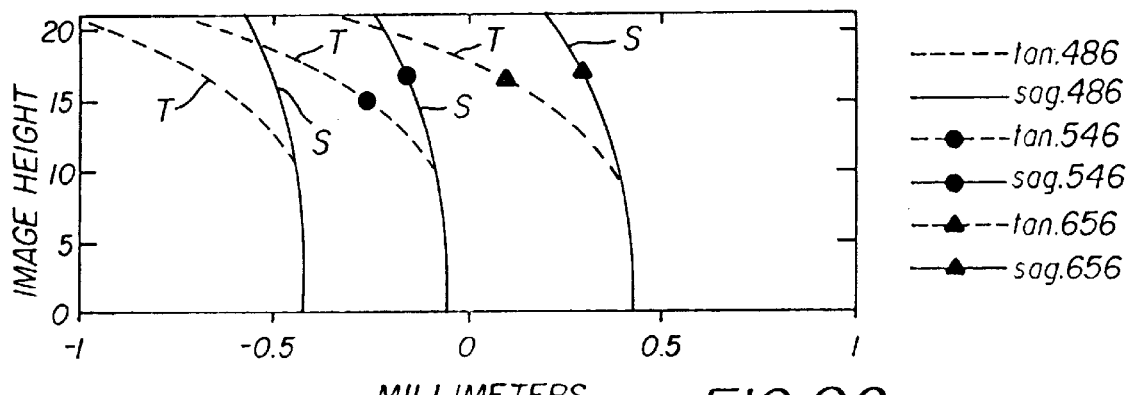
Figure 10A:
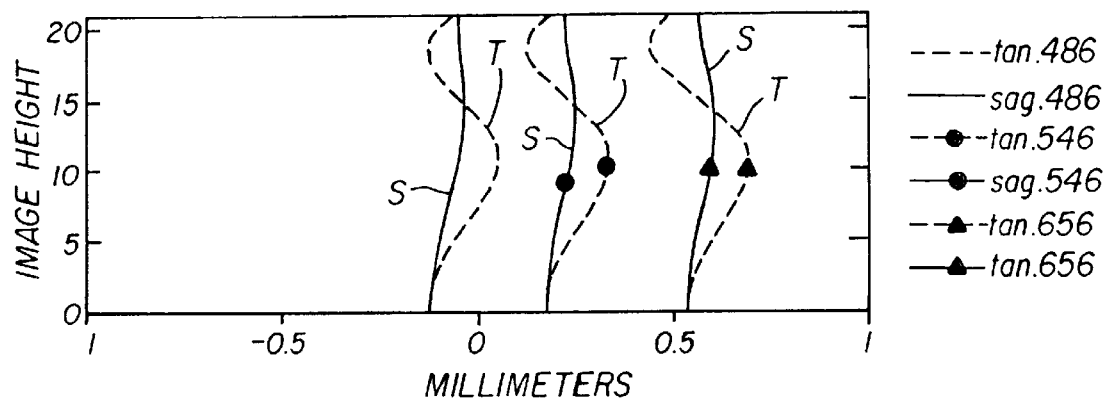
FIGS. 10A–10C are astigmatism aberration curves for the fourth embodiment at a wide angle, mid zoom, and telephoto position, respectively.
Figure 10B:
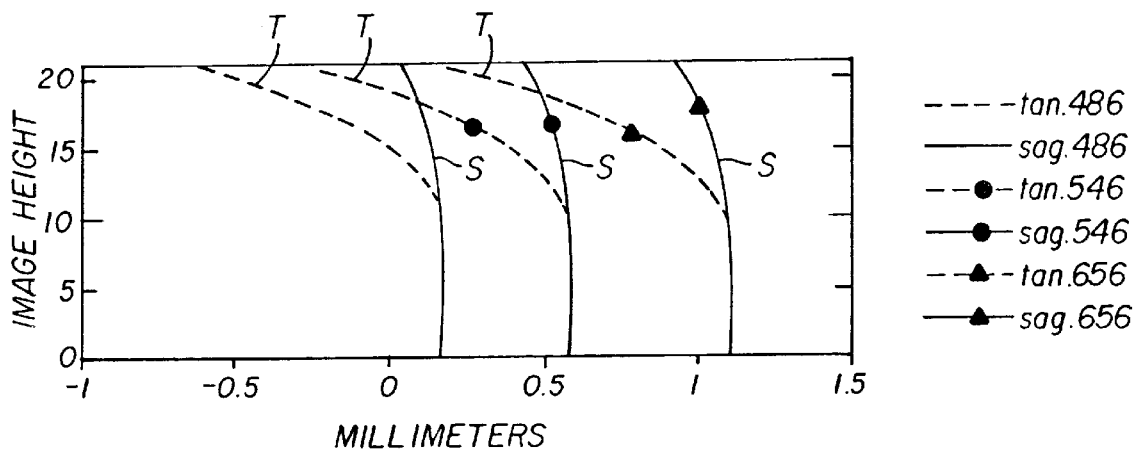
Figure 10C:
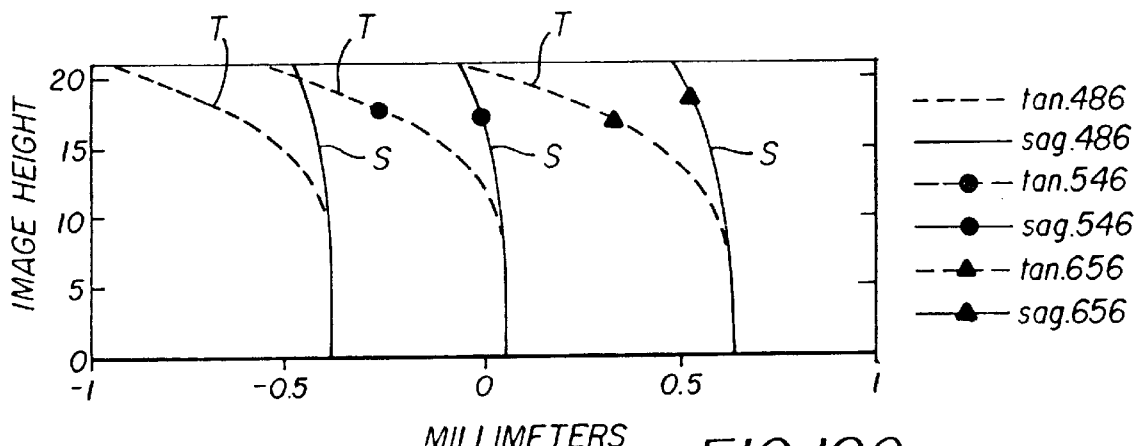
Figure 11A:
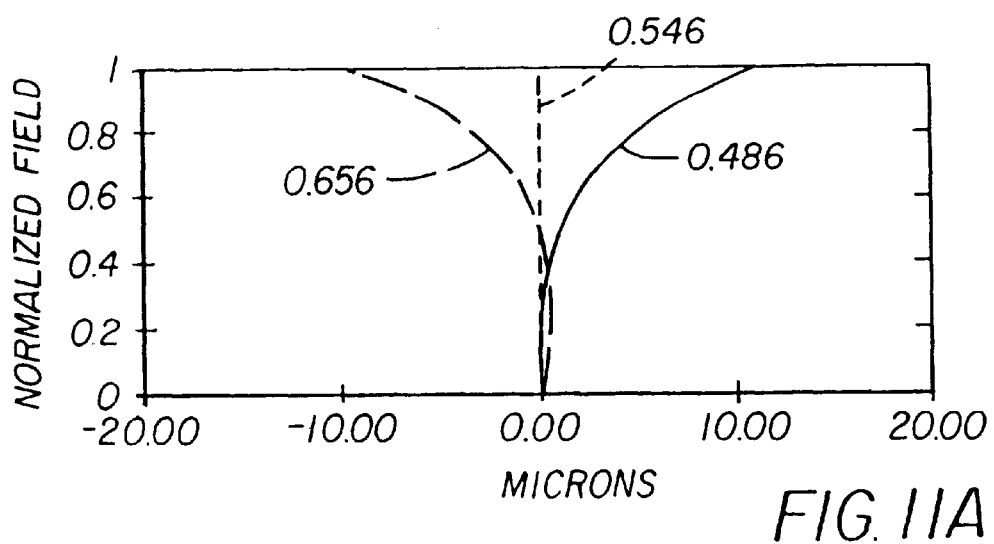
FIGS. 11A–11C are lateral color aberration curves for the first embodiment at a wide angle, mid zoom, and telephoto position, respectively.
Figure 11B:
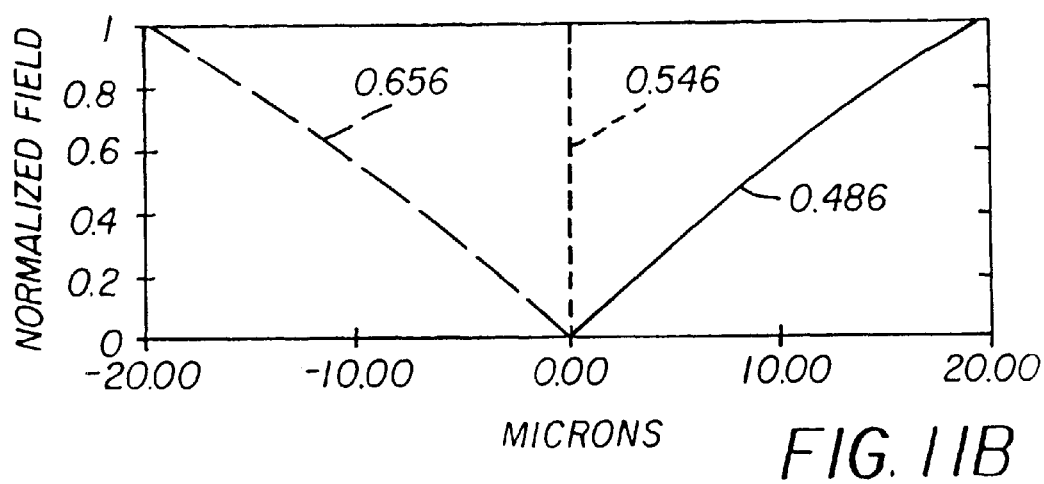
Figure 11C:
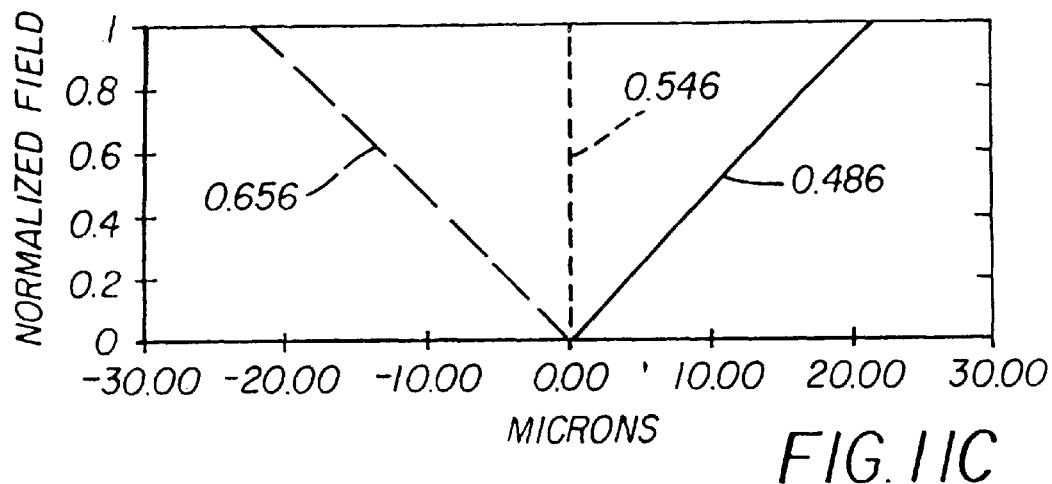
Figure 12A:
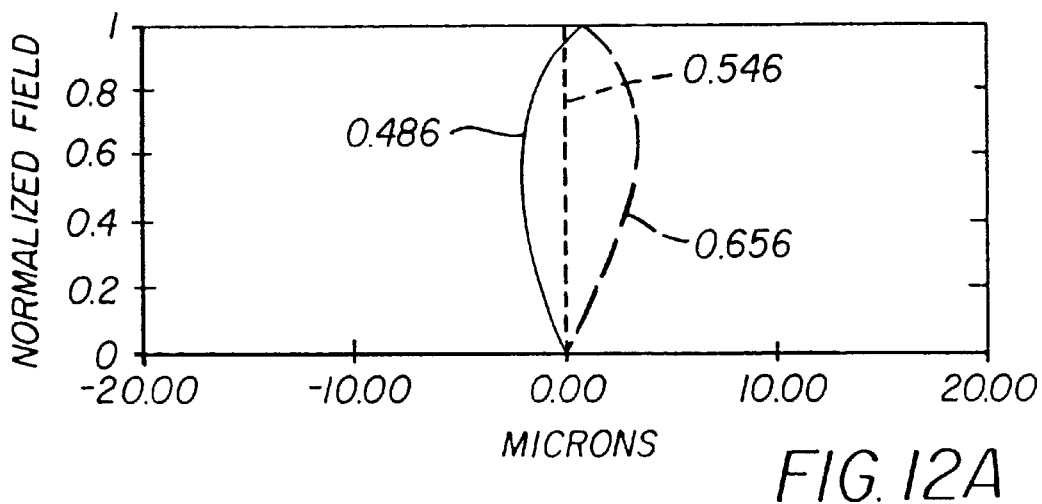
FIGS. 12A–12C are lateral color aberration curves for the second embodiment at a wide angle, mid zoom, and telephoto position, respectively.
Figure 12B:
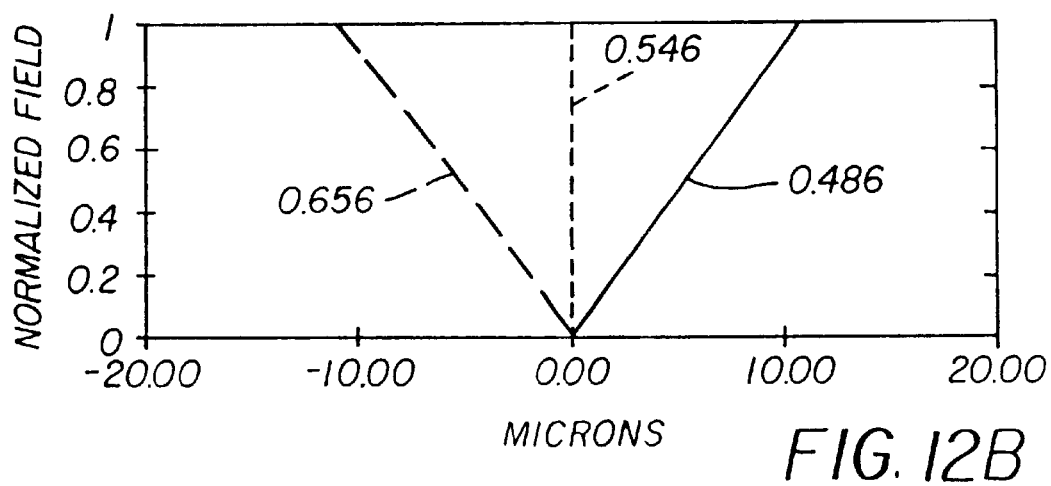
Figure 12C:
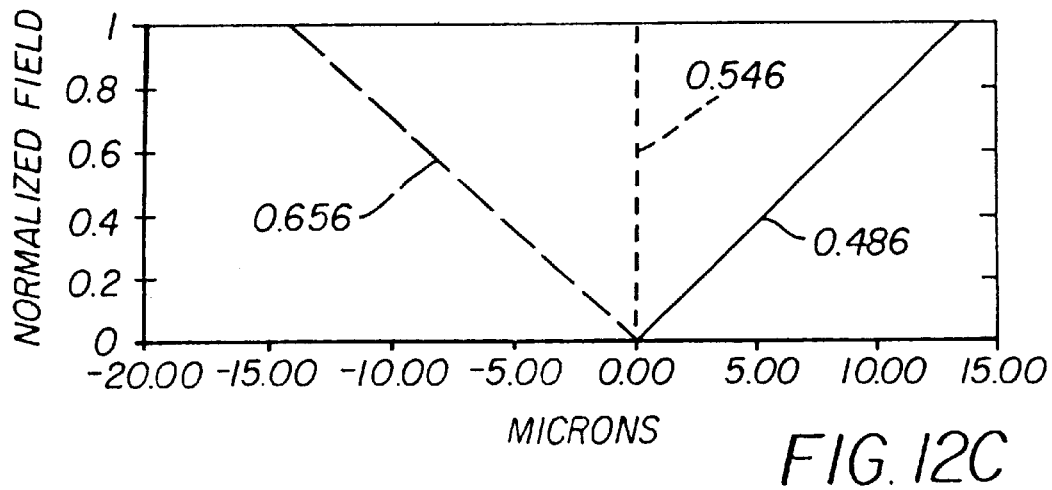
Figure 13A:
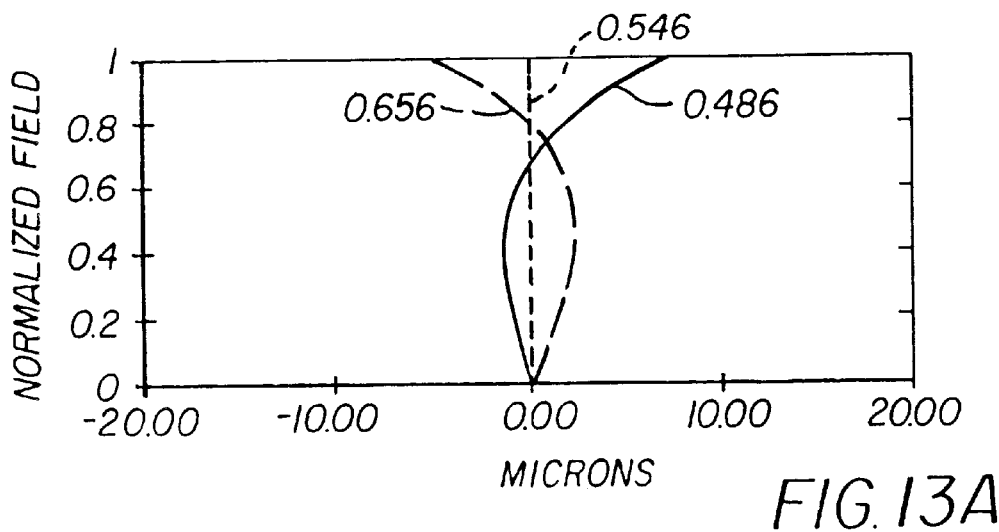
FIGS. 13A–13C are lateral color aberration curves for the third embodiment at a wide angle, mid zoom, and telephoto position, respectively.
Figure 13B:
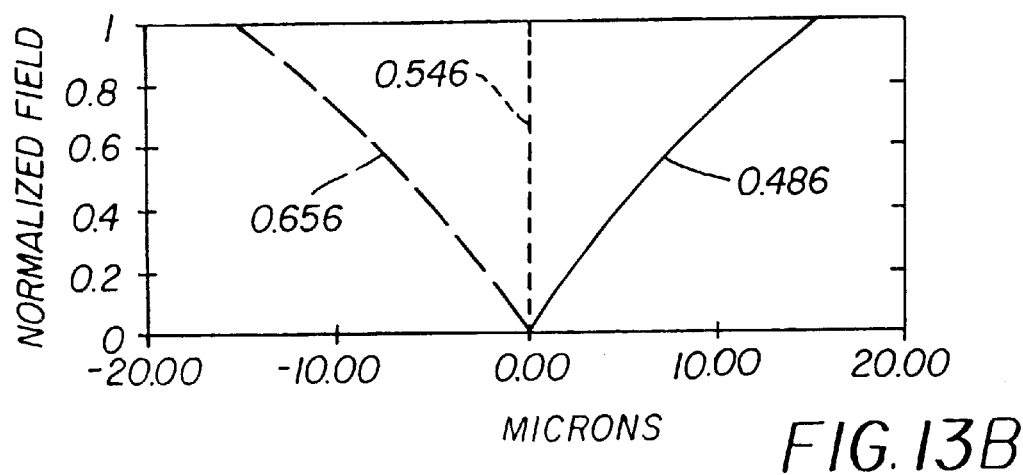
Figure 13C:
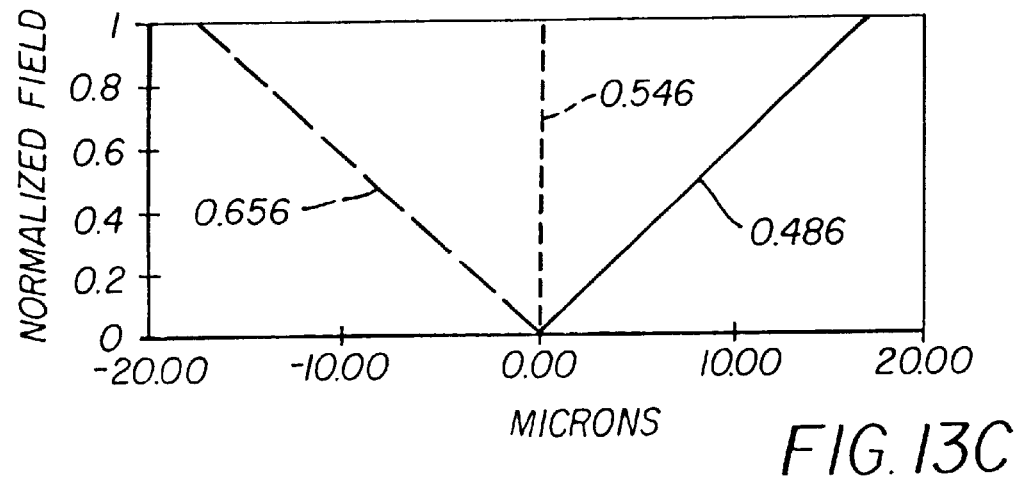
Figure 14A:
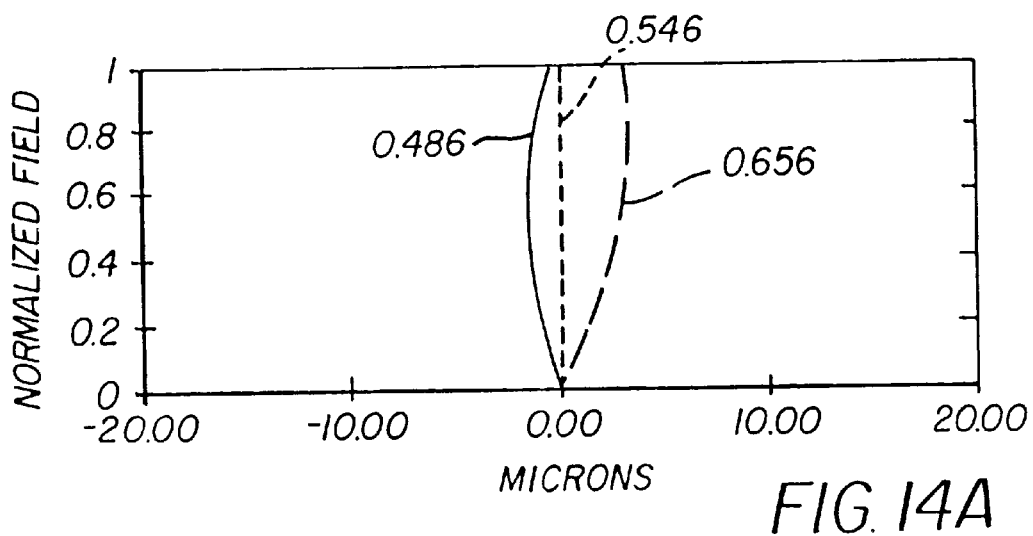
FIGS. 14A–14C are lateral color aberration curves for the fourth embodiment at a wide angle, mid zoom, and telephoto position, respectively.
Figure 14B:
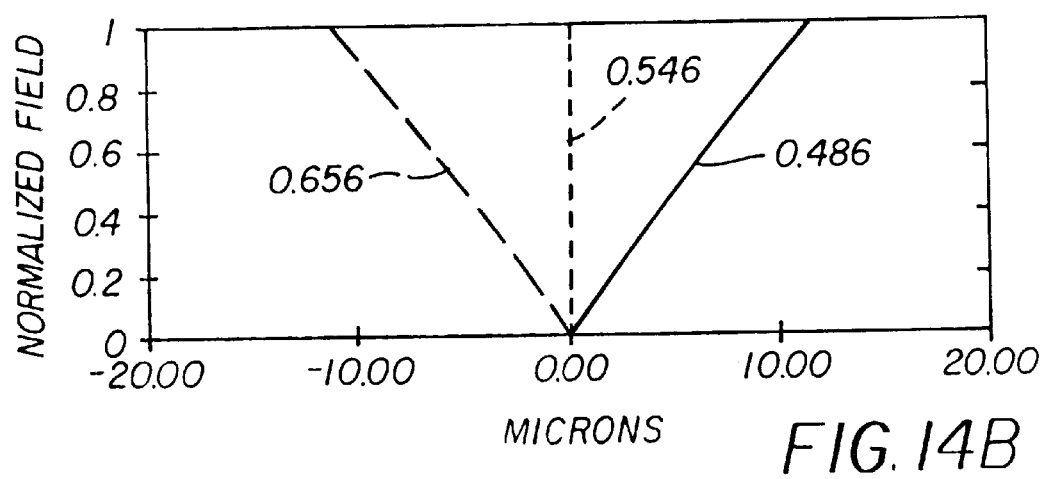
Figure 14C:
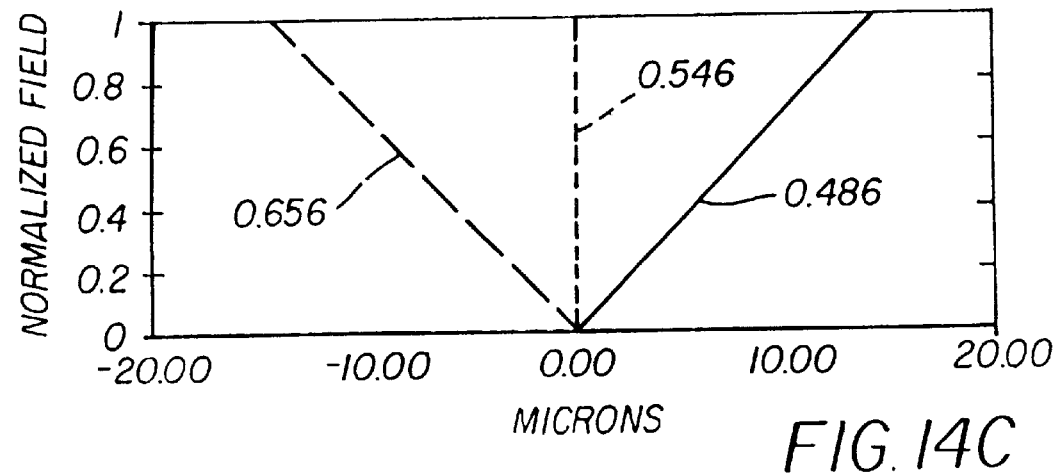

Referring to FIGS. 6A–6C, the MTF performance plots are measured at best focus using weighted wavelengths (486 nanometers at 15%, 546 nanometers at 50%, and 656 nanometers at 35%) at a frequency of 5 cycles per millimeter with full field being 20.58 mm (100% =20.58 mm). Additionally, FIGS. 10A–10C and FIGS. 14A–14C describe the performance of the zoom lens 40 of Example 4.

The invention has been described in detail with particular reference to certain preferred embodiments thereof, but it will be understood that variations and modifications can be effected within the spirit and scope of the invention.

What is claimed is:

1. A zoom lens comprising, in order from an object side:
    a first lens group having a first lens element and a second lens element; and
    a second lens group having a third lens element, wherein the zoom lens satisfies the following condition: $|\phi_1|/\phi_w<0.003$, where $\phi_1$ is a power of the first lens element and $\phi_w$ is a power of the zoom lens in a wide angle position.

2. The zoom lens according to claim 1, wherein at least one surface of the first lens element is aspherical.

3. The zoom lens according to claim 2, wherein the first lens element is a plastic element.

4. The zoom lens according to claim 1, wherein the first lens element is a meniscus lens having a concave surface on the object side.

5. The zoom lens according to claim 1, wherein the first lens element is a meniscus lens having a convex surface on the object side.

6. The zoom lens according to claim 1, wherein the second lens element is a spherical glass element.

7. The zoom lens according to claim 1, wherein the third lens element is a spherical glass element.

8. The zoom lens according to claim 1, wherein the first lens group includes a variable iris having a mechanical aperture stop positioned between the first lens element and the second lens element.

9. The zoom lens according to claim 1, wherein the first lens element is in a fixed position relative to the second lens element and moveably positioned relative to the third lens element.

10. A zoom lens comprising, in order from an object side:
    a first lens group having a first lens element and a second lens element; and
    a second lens group having a third lens element, wherein the zoom lens satisfies the following condition: $|\phi_1|/\phi_w<0.08$, where $\phi_1$ is a power of the first lens element and $\phi_w$ is a power of the zoom lens in a wide angle position.

11. The zoom lens according to claim 10, the first lens element having a first surface and a second surface, wherein at least one surface of the first lens element is aspherical.

12. The zoom lens according to claim 11, wherein both the first surface and the second surface are aspherical.

13. The zoom lens according to claim 11, wherein the first lens element is plastic.

14. A zoom lens comprising, in order from an object side:
    a first lens group having a first lens element and a second lens element, the first lens group having a power, the second lens element having a power; and
    a second lens group having a third lens element, wherein the power of the first lens group is substantially equal to the power of the second lens element.

15. The zoom lens according to claim 14, wherein the first lens element has at least one aspherical surface.

16. The zoom lens according to claim 14, wherein the zoom lens satisfies the following condition: $|\phi_1|/\phi_w<0.003$, where $\phi_1$ is a power of the first lens element and $\phi_w$ is a power of the zoom lens in a wide angle position.

17. The zoom lens according to claim 14, wherein the zoom lens satisfies the following conditions: $|\phi_1|/\phi_w<0.08$, where $\phi_1$ is a power of the first lens element and $\phi_w$ is a power of the zoom lens in a wide angle position.

18. A zoom lens comprising, in order from an object side:
    a first lens group including a plastic first lens element having at least one aspherical surface and a glass second lens element having spherical surfaces; and
    a second lens group including a glass third lens element having spherical surfaces, wherein the zoom lens satisfies the following condition: $|\phi_1|/\phi_w<0.003$, where $\phi_1$ is a power of the first lens element and $\phi_w$ is a power of the zoom lens in a wide angle position.

19. The zoom lens according to claim 18, wherein the first lens element is a meniscus lens having a concave surface on the object side.

20. The zoom lens according to claim 18, wherein the first lens element is a meniscus lens having a convex surface on the object side.

* * * * *